(12) United States Patent
Oswald et al.

(10) Patent No.: US 8,314,732 B2
(45) Date of Patent: Nov. 20, 2012

(54) ADAPTIVE RADAR

(75) Inventors: Gordon Kenneth Andrew Oswald, Huntingdon (GB); Edwin Christopher Carter, Chesterton (GB); Per Arne Vincent Utsi, Ely (GB); Samuel Julius Pumphrey, Cambridge (GB); Desmond Keith Phillips, Cambridge (GB); Michael Hugh Burchett, Cambridge (GB); Allan Geoffrey Smithson, Linton (GB); Jonathan Peter Edgecombe, Cambridge (GB)

(73) Assignee: Cambridge Consultants Ltd. (GB)

( * ) Notice: Subject to any disclaimer, the term of this patent is extended or adjusted under 35 U.S.C. 154(b) by 307 days.

(21) Appl. No.: 12/525,061

(22) PCT Filed: Jan. 31, 2008

(86) PCT No.: PCT/GB2008/000326
§ 371 (c)(1),
(2), (4) Date: Dec. 30, 2009

(87) PCT Pub. No.: WO2008/093092
PCT Pub. Date: Aug. 7, 2008

(65) Prior Publication Data
US 2010/0109938 A1    May 6, 2010

(30) Foreign Application Priority Data

Jan. 31, 2007  (GB) .................................. 0701869.0
Nov. 9, 2007   (WO) ................. PCT/GB2007/004288

(51) Int. Cl.
*G01S 7/41* (2006.01)

(52) U.S. Cl. ........................... 342/90; 342/114; 342/195

(58) Field of Classification Search .................... 342/90, 342/114, 195
See application file for complete search history.

(56) References Cited

U.S. PATENT DOCUMENTS

| 4,005,415 A | * | 1/1977 | Kossiakoff et al. | ............. 342/90 |
| 4,540,985 A | * | 9/1985 | Clancy et al. | .................... 342/90 |
| 4,542,382 A |   | 9/1985 | Hol | |
| 4,550,318 A | * | 10/1985 | Prengaman et al. | ............ 342/90 |
| 4,622,552 A |   | 11/1986 | Andrews et al. | |
| 4,714,927 A |   | 12/1987 | Siegel | |

(Continued)

FOREIGN PATENT DOCUMENTS

EP    0291337    11/1988

(Continued)

OTHER PUBLICATIONS

"International Application Ser. No. PCT/GB2007/004288, International Search Report and Written Opinion Aug. 18, 2008", 25 pgs.

(Continued)

*Primary Examiner* — John B Sotomayor
(74) *Attorney, Agent, or Firm* — Schwegman Lundberg & Woessner, P.A.

(57) ABSTRACT

A method of classifying items from reflected signals returned from said items is disclosed, the method comprising: processing said return signals to discriminate between a first set of signals indicative of items of interest and a further set of signals indicative of clutter; identifying items from said first set of signals and classifying them as a first class of item; processing said further set of signals to identify a second set of signals indicative of further items of interest; identifying items from said second set of signals and classifying them as a second class of item.

51 Claims, 14 Drawing Sheets

U.S. PATENT DOCUMENTS

| | | | | |
|---|---|---|---|---|
| 4,992,795 | A * | 2/1991 | Lassallette et al. | 342/90 |
| 5,202,691 | A * | 4/1993 | Hicks | 342/90 |
| 5,311,188 | A | 5/1994 | Meijer et al. | |
| 5,343,203 | A | 8/1994 | Chen | |
| 5,381,151 | A | 1/1995 | Boles et al. | |
| 5,392,050 | A * | 2/1995 | Guerci et al. | 342/90 |
| 5,867,118 | A * | 2/1999 | McCoy et al. | 342/90 |
| 6,259,396 | B1 * | 7/2001 | Pham et al. | 342/90 |
| 6,307,501 | B1 | 10/2001 | Wills et al. | |
| 6,404,380 | B2 * | 6/2002 | Poore, Jr. | 342/96 |
| 6,538,599 | B1 | 3/2003 | David | |
| 7,199,750 | B2 * | 4/2007 | Bourdelais et al. | 342/90 |
| 7,218,270 | B1 * | 5/2007 | Tamburino | 342/96 |
| 7,345,621 | B2 * | 3/2008 | Bourdelais et al. | 342/90 |
| 2001/0033246 | A1 * | 10/2001 | Burchett et al. | 342/91 |
| 2002/0008657 | A1 * | 1/2002 | Poore, Jr. | 342/96 |
| 2005/0001759 | A1 * | 1/2005 | Khosla | 342/90 |
| 2005/0058021 | A1 | 3/2005 | Feintuch et al. | |
| 2005/0280571 | A1 | 12/2005 | Abatzoglou et al. | |
| 2010/0109938 | A1 * | 5/2010 | Oswald et al. | 342/90 |
| 2010/0265122 | A1 * | 10/2010 | Oswald | 342/136 |
| 2011/0241928 | A1 * | 10/2011 | Oswald et al. | 342/90 |

FOREIGN PATENT DOCUMENTS

| | | |
|---|---|---|
| EP | 0472974 | 3/1992 |
| EP | 0474613 | 3/1992 |
| EP | 1098206 | 5/2001 |
| EP | 1712931 | 10/2006 |
| FR | 2487078 | 1/1982 |
| GB | 1350810 | 4/1974 |
| GB | 2247374 | 2/1992 |
| GB | 2280564 | 2/1995 |
| GB | 2346752 | 8/2000 |
| GB | 2350959 | 12/2000 |
| WO | WO-0184178 A1 | 11/2001 |
| WO | WO-2005050240 A2 | 6/2005 |

OTHER PUBLICATIONS

"International Application Ser. No. PCT/GB2008/000326, International Search Report and Written Opinion Mar. 4, 2009", 31 pgs.

"United Kingdom Application Ser. No. GB0701869.0, Search Report dated Jun. 8, 2007", 6 pgs.

Bergin, Jameson S., et al., "Multiresolution Signal Processing Techniques for Ground Moving Target Detection Using Airborne Radar", *EURASIP Journal on Applied Signal Processing*, vol. 2006, (2006), 1-16.

Blair, W. D., et al., "Interacting Multiple Model Filter for Tracking Manuevering Targets in Spherical Coordinates", *IEEE Proceedings of the Southeast Conference*, vol. 2, (Jan. 1991), 1055-1059.

Chen, Victor C., et al., "Micro-Doppler Effect in Radar: Phenomenon, Model, and Simulation Study", *IEEE Transactions on Aerospace and Electronic Systems*, vol. 42, No.1, (Jan. 2006), 2-21.

Guerci, J. R., et al., "Multiresolution GMTI Radar", *Conference Record of the 37th Asilomar Conference on Signals, Systems & Computers*, vol. 1, (Nov. 9, 2003), 50-53.

Itoh, Toshiharu, et al., "Motion Compensation for ISAR Via Centroid Tracking", *IEEE Transactions on Aerospace and Electronic Systems*, vol. 32, No. 3, (Jul. 1996), 1191-1197.

Kreucher, Chris, et al., "Particle Filtering for Multitarget Detection and Tracking", *Aerospace, 2005 IEEE Conference Big Sky MT*, (Mar. 5, 2005), 2101-2116.

Kreyenkamp, O., et al., "Doppler compensation in forward-looking STAP radar", *IEEE Proceedings: Radar, Sonar & Navigation*, vol. 148, No. 5, (Oct. 2, 2001), 253-258.

Kwag, Y. K., et al., "A Programmable Pulsed Doppler Radar Signal Processor Implementation with DSP for Adaptability and Multi-Function", *IEEE International Conference Brighton UK*, (Jan. 1, 1992), 379-382.

Petsios, Michail N., et al., "Maneuvering target tracking using multiple bistatic range and range-rate measurements", *Signal Processing*, vol. 87, No. 4, (Nov. 18, 2006), 665-686.

Richardson, P. G., "Effects of Maneuver on Space Time Adaptive Processing Performance", *Radar '97, IEEE Conference Edinburgh*, vol. 449, (Oct. 14, 1997), 285-289.

Wu, R., et al., "Time-varying complex spectral analysis via recursive APES", *IEEE Proceedings: Radar, Sonar & Navigation*, vol. 145, No. 6, (Dec. 1, 1998), 354-360.

\* cited by examiner

ADAPTIVE RADAR

CROSS-REFERENCE TO RELATED APPLICATIONS

This application is a nationalization under 35 U.S.C.§371 of PCT/GB2008/000326, filed Jan. 31, 2008, and published as WO 2008/093092 A2 on Aug. 7, 2008, which claims priority to PCT/GB2007/004288, filed Nov. 9, 2007, and published as WO 2008/093036A2 on Aug. 7, 2008, which claims priority under U.S.C.§119 to United Kingdom Application No. 0701869.0, filed Jan. 31, 2007, which applications and publication are incorporated herein by reference in their entirety and made a part hereof.

The present invention relates to a method of processing signals, and is particularly concerned with a method of processing signals for use in detecting, locating, tracking and imaging of objects through the processing of the output signal from an object detection system such as a radar system.

The present invention relates in particular to systems for detecting the presence of objects and determining whether their trajectory represents a hazard either to themselves or to other objects nearby. Examples of such systems are to be found in the fields of automotive collision warning, robotic guidance, missile test and defence, domestic intrusion and safety alarms.

One purpose of such systems is to give an indication that some form of action needs to be taken as a result of the measured position or trajectory of a detected object, or target. It will be appreciated that in the art the words "object" and "target" are at times used interchangeably, and that use of the word "target" in a non-military application is not intended to be misconstrued as implying literal targetting. The meaning will be understood from the context.

An object detection system preferably comprises a signal generator, transmitter and sensor system. Sensor systems may consist of a detector of some form, whose output signals are provided as an input to a signal processor. The detector is preferably capable of detecting aspects of objects relating to their position, size, speed etc. and uses an appropriate transducer to generate an output signal which represents a characteristic or the behaviour of a detected object. Appropriate transducers include, for example, radar transceivers, Lidar transceivers, ultrasonic transceivers, infrared transceivers or cameras or video cameras.

The object of a successful detection system is to achieve sufficient gain, a sufficiently high signal-to-noise ratio, or sufficient discrimination of the target signal against unwanted signals. Ideally, limitation of the resolution of such detection systems due to the dimensions of their antennae, and/or due to the bandwidths of their signals, is minimised.

Trade-offs between conflicting requirements of radar systems are preferably optimised depending on requirements. Examples of such trade offs include those between determining the distance of the target from the sensor, estimating its speed, resolving it from other targets and determining the angle subtended by the target with the sensor axis i.e. between range, speed and angular resolution, and also to fit within a given enclosure, to report at a certain minimum rate and to cost less than a maximum amount.

The radar systems preferably work with both stationary and moving targets, and can determine the target range to a required degree of accuracy. Unnecessary additional layers of signal processing are preferably avoided, for example additional layers for obtaining range, for providing the ability to receive while still transmitting, and for providing sufficiently precise phase control in, for example, a frequency-modulated continuous wave (FMCW) radar system.

Target range may be determined by measuring the time-of-flight of a pulse and the rate of change of position may be calculated after the target has been detected more than once. Improved estimates of position may then be obtained by applying a digital filter (such as a Kalman filter) to a recorded track history, especially if angular position is also obtained, for example by using a rotating antenna with a narrow beam.

Advantageously, the radar system is capable of resolving multiple targets at the same or similar range in terms of the angular position as seen from a fixed, broad-beam sensor.

Coherent, i.e. phase-synchronised, pulses and Doppler frequency-domain processing may be used. Here, the available gain depends on the bandwidth of the returned signal. This is limited in Doppler resolution when a high-bandwidth signal is used. For a short pulse, say of duration 0.5 ns at 24 GHz, this method advantageously reduces the noise bandwidth by a factor proportional to the modulation bandwidth as a fraction of carrier frequency, and for a sufficiently short pulse repetition interval (PRI) may allow coherent integration during the time that the target moves through a range equivalent to half the pulse length. The radar system may provide some degree of angular resolution for a moving, but non-rotating, broad-beam sensor, via the detection of different Doppler frequencies for targets at different bearings. This ability is preferably optimised against the bandwidth with minimum negative impact on the range resolution.

Angular resolution may be determined using an array radar employing a number of spaced-apart elements whose outputs are combined to form a beam or alternatively compared to measure phase differences. In such a radar angular resolution is preferably optimised against the size of the array taking into account limitations of the platform on which it is mounted (for example a car, aircraft, other moving platform or the like).

The present invention aims to provide an improved method for processing signals and in particular a method of processing signals for use in detecting, locating, tracking and imaging of objects through the processing of the output signal from an object detection system such as a radar system.

The present approach draws on elements related to synthetic-aperture radar and inverse synthetic-aperture radar.

Synthetic-aperture radar (SAR) is well-known in remote sensing, airborne and satellite-based mapping applications. The process involves having a single antenna emit radar pulses as its hosting platform moves over a stationary target, recording the amplitude and phase of the echo signals, and combining the echo signals using sophisticated signal post-processing. This processing has the effect of producing echo signal data equivalent to that which would be produced by a single, large antenna with an effective aperture of the dimension of the distance moved i.e. much greater than that of the original antenna, and which therefore has a much narrower effective beam and consequently higher resolution.

Interferometric SAR (InSAR) is a related radar technique which makes use of the phase data of SAR to determine information about the angular position of a target. This may be achieved by using two antennas, receiving and/or emitting pulses simultaneously. The phase difference of the echo signals contains information about the direction and/or angle of the target. InSAR is used, for example, to determine three-dimensional terrain data.

Inverse synthetic-aperture radar (ISAR) is another single antenna radar technique used for determining the motion of a target by analysis of the phase history of its reflections through a period of relative motion. This can be used to generate two-dimensional high resolution images of a target. ISAR may avoid the use of a large bandwidth transmitted signal, achieving high range resolution by applying a restrictive model to the expected target motion (usually assuming linear motion), and is sensitive to any rotation or acceleration of the target.

Conventional operation of a radar as a moving-target indicator (MTI) is inconsistent with operation as a synthetic aperture radar (SAR), usually with external motion compensation, since target motion causes distortion in image position. Some prior radar systems can be switched over from SAR mode to MTI mode. This uses the same radar equipment but applies different filters and beam forming processes. In either mode, the output is affected by the relative motions. In SAR mode, an object moving relative to the scene being imaged also suffers a displacement relative to the image background. In MTI mode, the motion of the platform requires adaptive Doppler filtering of fixed ground targets.

In some embodiments the method will resemble a conventional Doppler processor, or a synthetic aperture imager, but it is capable of much broader configuration and of efficient operation with a wide range of signals and target motions.

International Patent Application No. PCT/GB96/02448, which names Cambridge Consultants Ltd as patent applicant and whose disclosure is incorporated by reference, discloses apparatus for and method of determining positional information for an object, including a method for determining the position of an object by means of detecting the relative timing of probe signals returned by said object at a plurality of spaced apart locations.

International Patent Application No. PCT/GB93/01056, which names Cambridge Consultants Ltd as patent applicant and whose disclosure is incorporated by reference, discloses a method of and apparatus for detecting the displacement of a target, including a method for detecting the displacement of a target by means of comparing return signals from said target and stored reference data comprising data representative of the environment.

International Patent Application No. PCT/GB94/00738, which names Cambridge Consultants Ltd as patent applicant and whose disclosure is incorporated by reference, discloses apparatus and method for displacement determination, data transfer and assessment, including a method for assessing the approach of an object to a specified point.

International Patent Application No. PCT/GB01/00500, which names Cambridge Consultants Ltd as patent applicant and whose disclosure is incorporated by reference, discloses methods and apparatus for obtaining positional information, including a method for configuring transmitting and receiving antenna elements so as to provide for so-called "range gates" used in determining range by means of transmitting a series of signal pulses and detecting their reflections.

United Kingdom Patent Application No. 0701869.0, which names Cambridge Consultants Ltd as patent applicant and whose disclosure is incorporated by reference, discloses methods and apparatus for processing signals, and is particularly concerned with a method of processing signals for use in detecting, locating, tracking and imaging of objects through the processing of the output signal from an object detection system such as a radar system.

International Patent Application No. PCT/GB2007/004288, which names Cambridge Consultants Ltd as patent applicant and whose disclosure is incorporated by reference, discloses methods and apparatus for processing signals, and is particularly concerned with a method of processing signals for use in detecting, locating, tracking and imaging of objects through the processing of the output signal from an object detection system such as a radar system.

Target Classification

Target classification is known to be a difficult problem in the field of radar systems. In coherent systems even small changes in the target position, orientation or motion can result in a wide variation in intensity of the reflected signal.

The present invention provides a method which makes use of signal processing techniques to identify and classify targets by subjecting the reflected signals to a cascade of first and higher order filters, thereby enabling consideration of linear and higher evolutions of projected target trajectories.

An immediate advantage is that target tracking is substantially improved, as track recovery can be achieved by consideration of the target motion across several orders of time differential simultaneously. A loss of the target track in the linear filter (caused, for example, by the target accelerating) may be recovered by searching the same space volume for the target at higher filter orders.

According to an aspect of the present invention there is provided a method for classifying items from reflected signals received from one or more items, the method comprising:
    discriminating said return signals as between subjects and objects; and
    classifying the associated item as a subject or an object accordingly.

It will be appreciated that in certain embodiments the present invention presents a method of determining additional valuable information from existing reflected radar signal, for example from what is known in the art as 'clutter', and does not require further signal transmission.

According to an aspect of the invention there is provided a method of classifying items from reflected signals returned from said items, the method comprising: processing said signals to discriminate between a first set of signals indicative of items of interest and a further set of signals indicative of clutter; identifying items from said first set of signals and classifying them as subjects (a first class of item); processing said further set of signals to identify a second set of signals indicative of further items of interest; identifying items from said second set of signals and classifying them as objects (a second class of item).

The signals of the first set are preferably indicative of items of which each item is moving at least in part. The signals of the second set are preferably indicative of substantially stationary items.

Preferably at least one attribute of the identified item is determined from the return signals and the item classified accordingly. A history of the or each attribute is preferably maintained for an identified item and the corresponding item classified in dependence on said history. The attribute history may be maintained for an item preferably from when it is first detected.

A prediction of the or each attribute is preferably determined and the item classified in dependence on its conformity with said prediction. The prediction may be refined over time in dependence on historical data.

The attribute or history thereof may be compared with a modelling function and the item classified in dependence on said comparison. The attribute or history thereof may be iteratively compared with modelling functions of increasingly higher order and classifying the item accordingly. The or at least one modelling function may be a mathematical function (for example a polynomial). The or at least one modelling function may be an oscillatory function. The or at least one modelling function may be adaptive over time in dependence on historical attribute data.

The attribute or history thereof may be compared with a stored attribute or stored attribute history and the item classified in dependence on said comparison. The at least one attribute may comprise at least one of position, range, range rate, velocity, acceleration, track, and trajectory.

At least one characteristic of a return signal from an identified item may be determined and the item classified accordingly.

A history of the or each characteristic may be maintained for an identified item and the item classified in dependence on said history. The characteristic history may be maintained for an item from when it is first detected.

A prediction of the or each characteristic may be determined and the item classified in dependence on its conformity with said prediction. The prediction may be refined over time in dependence on historical data.

The characteristic or history thereof may be compared with a modelling function and the item classified in dependence on said comparison. The characteristic or history thereof may be iteratively compared with modelling functions of increasingly higher order a the item classified in dependence on said comparison.

The or at least one modelling function may be a mathematical function (for example a polynomial). The or at least one modelling function may be an oscillatory function. The or at least one modelling function may be adaptive over time in dependence on historical characteristic data. The at least one characteristic or history thereof may be compared with a stored characteristic or characteristic history and the item classified in dependence on said comparison.

The at least one characteristic may comprise at least one of phase, phase mismatch, and amplitude or signal strength/intensity.

A velocity of at least part of each identified item may be determined from said return signals and the item classified accordingly. An item may be classified as said first class of item if said velocity is non-zero. An item may be classified as said first class of item if said velocity is non-zero for a predetermined number or percentage of scans. An item may be classified as said first class of item if said velocity is non-zero when averaged over time. An item may be classified as said second class of item if said velocity is zero. An item may be classified as said second class of item if said velocity is zero for a predetermined number or percentage of scans. An item may be classified as said second class of item if said velocity is below a predetermined threshold when averaged over time.

An item classified as said first class of item may remain so classified for, preferably, at least a predetermined number of scans after reflected signals from said subject are no longer received.

The classification may be dependent on a confidence level that said item has been correctly classified as a first or second class of item. When an item is classified said classification preferably persists in dependence on a confidence level that said item has been correctly classified. The method may comprise processing signals returned from a classified item over time and may comprise maintaining said classification, reclassifying said item, or declassifying said item in dependence on said processing. A classified item may be initially classified as a second class of item and as a result of said processing over time said item may be reclassified as a first class of item.

Return signals from items classified as items of said first class or said second class may be processed and said items further classified into different classes or sub-classes accordingly. Each classification, reclassification, declassification, and/or classification into a sub-class may be stored in a classification history for the item to which they relate.

The classification may comprise deriving an indication of a material type for an item from the corresponding return signals and classifying the item accordingly.

An item may be classified in dependence on its interaction with another item. The interaction may comprise one item moving behind another.

Small-scale movements of an item may be detected and said item classified in dependence of the nature of said movement. The small-scale movements may be oscillatory. Said oscillatory movement may be indicative of breathing.

Clusters of responses from different parts of an item may be identified and the item classified in dependence on the nature of said cluster. The cluster may comprise between three and fifteen responses, preferably five or more responses, preferably twelve or less responses, and preferably ten responses.

A threat level for an item may be determined and the item classified into a class or sub-class accordingly.

A representation of each classified item is preferably output for display. Each representation: may be configured to convey a confidence level that the item it represents has been correctly classified; may be configured to change over time in dependence on changes to the confidence level; may be configured to convey a threat level determined for the item it represents; may be configured to change over time in dependence on changes to its threat level; may be configured to convey the classification of the item it represents; may be configured to change over time in dependence on changes to the classification; and/or may be configured to illustrate historical changes to the item it represents over time An alert signal (for example for a visual, audible or other form of alert) may be output when an item previously classed as a second class of item are re-classified as a first class of item.

The method preferably comprises determining a characteristic of each said return signal; coherently integrating said characteristic over a plurality of time separated signals using a filter comprising a plurality of branches, each branch representing a possible attribute of said item; determining a specific branch of the filter in which a response is located, and determining a derived attribute of said item as being equivalent to the possible attribute represented by the specific branch; and classifying said item depending on said derived attribute.

According to another aspect of the invention there is provided a method of classifying items from reflected signals returned from said items, the method comprising: processing said signals to discriminate between a first set of signals indicative of items of interest, of which each item is moving at least in part, and a further set of signals indicative of substantially stationary items; identifying said moving items of interest from said first set of signals and classifying them as a first class of item; processing said further set of signals to identify a second set of signals indicative of substantially stationary items of interest; identifying said stationary items of interest from said second set of signals and classifying them as a second class of item.

According to another aspect of the invention there is provided a method of processing a plurality of signals indicative of the presence of at least one item, the method comprising: determining a characteristic of each said signal; coherently integrating said characteristic over a plurality of time separated signals using a filter comprising a plurality of branches, each branch representing a possible attribute of said item; determining a specific branch of the filter in which a response is located, and determining a derived attribute of said item as being equivalent to the possible attribute represented by the specific branch; and classifying said item depending on said derived attribute.

The filter preferably comprises a cluster of responses, each cluster characterising a single item and preferably said method comprises classifying said item depending on characteristics of said cluster.

The invention further provides apparatus for classifying items from reflected signals returned from said items, the apparatus comprising: means for receiving said return signals (for example a receiver); means for processing said return signals (for example a processor) said processing means being configured for: processing said return signals to discriminate between a first set of signals indicative of items of interest and a further set of signals indicative of clutter; identifying items from said first set of signals and classifying them as a first class of item; processing said further set of signals to identify a second set of signals indicative of further items of interest; identifying items from said second set of signals and classifying them as a second class of item.

The processing means is preferably configured to carry out the method according to any corresponding method aspect.

The apparatus preferably comprises means for displaying a representation of said item. The apparatus preferably comprises means for issuing an alert if the classification of an item changes.

The apparatus preferably comprises means for outputting a representation of each classified item for display, and means for displaying said representation of said item.

The apparatus preferably comprises means for outputting an alert signal if the classification of an item changes and means for issuing an associated alert.

Preferably the processing means comprises means for extracting at least one attribute of an identified item and for classifying the item accordingly.

Preferably the processing means is configured for extracting at least one characteristic of a return signal from an identified item and for classifying the item accordingly The apparatus preferably comprises storage means for storing a history of the or each attribute/characteristic for an identified item wherein said processing means is configured for classifying the item in dependence on said history.

According to another aspect of the present invention there is provided a method of resolving items from signals received from said items, comprising: determining velocity and/or acceleration information for each item from said received signals; and discriminating between said items in dependence upon their velocity and/or acceleration.

The method may comprise comprising discriminating between said items in dependence upon whether the velocity and/or acceleration of the two items lies in respective non-overlapping bands. The velocity and/or acceleration of the items is preferably time-integrated (or averaged).

According to another aspect of the present there is provided a method of classifying items from reflected signals received from said items, the method comprising: discriminating said return signals as between subjects and objects; and classifying the associated item as a subject or object accordingly.

The method may comprise receiving further return signals from a classified item and re-classifying said item as a different one of subject, object or item of no interest in dependence on said further signals.

A velocity of said item is preferably determined from said return signal. The item may thus be classified as a subject if said velocity is non-zero, may be classified a subject if said velocity is non-zero for a predetermined number or percentage of scans, and/or may be classified as a subject if said velocity is non-zero when averaged over time.

The item may be classified as an object if said velocity is zero, the item may be classified as an object if said velocity is zero for a predetermined number or percentage of scans, and/or the item may be classified as an object if said velocity is below a predetermined threshold when averaged over time.

An item classified as a subject preferably remains so classified for a predetermined number of scans after reflected signals from said subject are no longer received. The classification may be dependent on a confidence level that said item is an object or subject. When an item is classified said classification preferably persists in dependence on a confidence level that said item has been correctly classified.

Active Perimeter

According to another aspect of the present invention there is provided a method for assessing at least one item in the vicinity of a site, said method comprising:
  transmitting a series of pulses;
  receiving pulses reflected from each item;
  processing said received pulses to determine positional information about each item;
  defining at least one adaptive site perimeter;
  assessing each item in dependence on a position relative to the at least one adaptive site perimeter.

Preferably, a plurality of site perimeters may be defined. The plurality of site perimeters may be defined simultaneously.

Preferably, said items may be classified into one or more of a plurality of classes. Said items may be assessed according to said corresponding classification. The perimeter may be defined dependent or according to said classes.

Preferably, the extent of the perimeter is different for different classes of item.

Preferably, said site perimeters may be defined by a predetermined warning time that is required from first sensing a threat, so that different site perimeters apply to items with different velocity.

The use of multiple perimeters allows for different classes of item to be treated separately according to the perceived threat. For example, fast-moving items may be associated with a wider perimeter than slow-moving items. This may be done to ensure the triggering of an alarm will provide similar minimum warning or reaction times irrespective of the item concerned.

In an alternative, each perimeter is preferably set independently for a specific detected target. This allows for a nuanced perimeter definition according to the assessed threat posed by the particular detected target. In a variant, a cascade of perimeters of decreasing extent can be defined for said target, corresponding to a series of warning zones of increasing severity as the target approaches.

Preferably, the received pulses are processed to determine velocity information about each item and the item classified according to said velocity information. The received pulses may be processed to determine and the item may be classified according to one or more of: directional information about each item; size information about each item; acceleration information about each item; and/or trajectory history for each item Each item may be classified according to whether it is located within a perimeter or outside a perimeter, or whether it is located in the vicinity of a perimeter. Preferably, said perimeter is a site perimeter. Such a perimeter would find use in protecting military installations or in a marine environment.

Preferably, said site perimeter can be adapted dependent on operational conditions, such as, for example, according to threat level.

Preferably, the extent of said perimeter may be adapted, for example according to changes in items in the vicinity of the perimeter.

Preferably, said perimeter extends to the location of items that limit the field of view.

Preferably, an alarm is triggered in dependence on the assessment of each item. The alarm may be triggered in dependence on whether the perimeter is breached, the perimeter is approached, there is an unexpected change in behaviour within the perimeter, and/or whether there is a perceived intention to breach the perimeter.

Preferably, a plurality of simultaneous perimeters is defined.

Preferably, the extent of the perimeter is different for different classes of item.

Preferably each perimeter is set for a specific detected target.

Preferably, the pulses are received at a plurality or multiplicity of arrays.

In an alternative embodiment, the active perimeter is combined with a video system.

According to another aspect of the present invention there is provided a system for assessing at least one item in the vicinity of a site, said system comprising:
  means for transmitting a series of pulses;
  means for receiving pulses reflected from each item;
  means for processing said received pulses to determine positional information about each item;
  means for defining at least one adaptive site perimeter; and
  means for assessing each item in dependence on a position relative to the at least one adaptive site perimeter.

Preferably, the system may define a plurality of site perimeters

Preferably, the system comprises means for classifying each item into one of a plurality of classes.

Preferably, said assessing means is operable assess each item dependent on said corresponding classification.

Preferably, said defining means is operable to define said site perimeters dependent on said classes.

Preferably, said processing means is configured for processing said received pulses to determine velocity information about each item; and preferably said classifying means are operable to classify the or each item according to said velocity information.

Preferably, said processing means is configured for processing said received pulses to determine directional information about each item; and preferably said classifying means is operable to classify the or each item according to said directional information.

Preferably, said processing means is configured for processing said received pulses to determine size information about each item; and preferably said classifying means is operable to classify the or each item according to said size information.

Preferably, said processing means is configured for processing said received pulses to determine acceleration information about each item; and preferably said classifying means is operable to classify the or each item according to said acceleration information.

Preferably, said defining means are operable to adapt the or each site perimeter dependent on operational conditions.

3D Radar & Vision

According to another aspect of the present invention there is provided a method for imaging an item detected by a detection system, the method comprising:
  extracting information from at least one return signal received from said item; and
  obtaining and/or processing an image in dependence on said information.

Preferably, said extracted information comprises positional information, for example, information related to the position of the item.

Preferably, said method comprises determining which portions of said image to extract for further analysis in dependence on said positional information.

Preferably, said method comprises superimposing information on said image dependent on said positional information.

Preferably, said extracted information is information regarding the classification of the item obtained from a target classification system.

Preferably said method comprises obtaining said image from a location depending on said positional information.

Preferably, said image is obtained by directing (for example cueing or zooming) imaging means at said location.

Preferably said method further comprises extracting information regarding the prior trajectory of the item, and obtaining and/or processing the image in dependence on the expected trajectory.

Preferably, said extracted information comprises the azimuth and/or elevation of the item.

Preferably, said extracted information comprises the range of the item.

Preferably, said image is obtained in mono. By use of for example a single camera rather than obtaining the image in stereo, whilst also using say a radar system to derive range and/or position information, processing requirements and cost can be reduced.

Preferably, said detection system is a radar system. Preferably, said image is obtained using a moving image camera.

Hence for example a combination of sensors can be utilized to reduce the false alarm rate.

Other preferable features of the method are recited with reference to other aspects of the invention.

Migration

According to an aspect of the present invention there is provided a method for processing a plurality of signals indicative of the presence of at least one target or item, the method comprising:
  determining a characteristic of each said signal; and
  coherently integrating said characteristic over time;
  wherein said characteristic is integrated over a plurality of time separated signals.

Coherent integration over a plurality of time separated signals can allow improved resolution of target or item, and in particular, improved discrimination between target or item at the same or similar ranges and having a similar angular position.

Preferably the signal is received at a plurality of receivers, and said characteristic is coherently integrated separately for the signal as received by each of the plurality of receivers.

Preferably said coherent integration comprises summing a given proportion of the characteristic for an earlier time separated signal with a given proportion of the characteristic of a later such signal.

Preferably said coherent integration comprises averaging the characteristic over said plurality of time separated signals.

The characteristic may comprise amplitude. The characteristic may comprise phase. The characteristic may comprise a complex number which may represent both amplitude and phase. The characteristic may comprise a frequency domain characteristic of said signal.

Preferably the phase of said signal is stored.

Preferably the amplitude of said signal is stored.

Preferably said integration step comprises processing said signal using a filter; wherein said filter comprises a plurality of branches, each branch representing an estimate of an attribute of said target or item.

According to an aspect of the present invention there is provided a method for processing a signal indicative of the presence of a target or item, the method comprising:

processing said signal using a filter;
wherein said filter comprises a plurality of branches, each branch representing an estimate of an attribute of said target or item.

Preferably said method comprises receiving said signal prior to said processing (or integration) step. Alternatively, the signal may be received by another process and stored for further processing by said processing step.

Preferably said method comprises determining a parameter relating to said target or item (e.g. range, phase, range rate or the like), said parameter being a function of said attribute (e.g. range rate, hyperbolic track, radial acceleration).

Preferably said processing step comprises extracting at least one characteristic (e.g. amplitude, phase, frequency, domain characteristic, or the like) from said signal.

Preferably said processing step comprises storing the at least one characteristic of said signal in at least one branch of said filter, at a position determined by said parameter.

The characteristic may be stored at a position in every branch. Alternatively, the characteristic may be stored in a selection of branches.

Preferably said processing step comprises predicting a change in said parameter for each branch based on the estimated attribute associated with said branch.

Preferably said processing step comprises adapting said filter in dependence on said predicted parameter.

Preferably said processing step comprises adapting said filter by moving said characteristic from said position in each corresponding branch to another position in dependence on said prediction.

Preferably said method further comprises evolving said filter and may comprise evolving the filter iteratively over time.

Preferably said method comprises receiving a further signal and evolving said filter in dependence on the further signal.

Preferably said method comprises determining said parameter relating to said target or item from said further signal and evolving said filter in dependence on said parameter.

Preferably said method comprises extracting a characteristic of said further signal and evolving said filter in dependence on said characteristic.

Preferably said method comprises evolving at least one branch of said filter, at a position determined by said parameter, in dependence on said characteristic.

Every branch of the filter may be evolved. Alternatively, a selection of branches may be evolved.

Preferably each branch evolved is evolved to an extent determined by a factor. Said factor may be constant or may vary linearly or non-linearly across the branches.

Preferably said method comprises evolving said filter by summing at least a proportion of said characteristic of said further signal with at least a proportion of a corresponding value stored in said filter.

Preferably said method comprises evolving said filter by summing a given proportion of said characteristic of said further signal with a given proportion of a corresponding value stored in said filter.

Preferably said given proportion for said characteristic is a function of said given proportion for said corresponding value.

Preferably said given proportion for said corresponding value is equal to or dependent on a factor.

Preferably said factor is less than one.

Preferably said factor is equal to or dependent on the reciprocal of a characteristic value. The characteristic value may represent a number of signals over which said filter is effectively evolved. The characteristic value may represent an effective number of signals over which said extracted characteristic is fractionally integrated.

Preferably said given proportion for said characteristic is equal to one minus the given proportion for said corresponding value.

Preferably said given proportion for said characteristic is equal to one minus the given proportion for said corresponding value.

Preferably said factor is dependent on the branch being evolved. Alternatively or additionally the factor may be dependent on the position within each branch being evolved. The factor may be constant for all branches and/or for all positions within each branch.

Preferably said method further comprises resolving a plurality of targets or items by analysing a time evolved form of said filter. Said target or item may be resolved by determining the locations of responses within said filter. The response may comprise a peak in said filter. The responses may be resolved using a peak detector.

Preferably the filter is evolved such that the branch of the filter in which a response is located represents substantially the derived attribute of a corresponding target or item.

Preferably the filter is evolved such that the position at which a response is located, within a branch of the filter, represents substantially the derived parameter of a corresponding target or item.

Preferably said method comprises classifying said item depending on said derived attribute.

Preferably the filter is evolved to contain a cluster of responses said cluster characterising a single target or item. Said target or item may be an item having components moving at the same or at different velocities. Said target or item object may be an object having components located at different ranges.

Preferably said method comprises classifying said object depending on said cluster.

Preferably at least a portion of said method is iterated for a plurality of time separated signals.

Preferably said filter is adaptive.

Preferably the filter is adaptive based on an adaptive configuration. The resolution of the filter may be adaptive. The width of each or any branch may be adaptive. The number of branches may be adaptive. The estimated attribute to which each branch relates may be adaptive.

Preferably the filter is adaptive based on signal contents. The location of the contents within the filter may be adaptive. The position of the contents within each branch may be adaptive.

Preferably the filter is adaptive based on the estimated attribute.

Preferably said filter is evolvable, and preferably said filter is evolvable iteratively over a plurality of time separated signals.

Preferably said attribute comprises a rate of change. The rate may comprise a rate at which the target or item changes range. The rate may comprise a velocity of the target or item.

Preferably said attribute comprises a trajectory of the target or item.

Preferably said attribute represents a track of the target or item, for example, relative to a sensor. The track may be a hyperbolic estimate of the target or item's movement.

Preferably said attribute is a frequency domain attribute of said target or item.

Preferably said attribute is a rate of acceleration of said target or item.

Preferably said filter comprises a first order filter. The filter may alternatively or additionally comprise a second order filter.

Preferably said filter comprises an undulation filter.

Undulation filtering is a time-related process in which a series of received signals are operated on by a set of anticipated sequences of delay evolution (for example, by compensation for linear phase evolution), and discriminated through coherent integration. The actual operations are chosen depending on the nature of the signal to be used, and the sequences depend on the nature of the targets and motion.

Preferably said filter comprises an array. Each branch of said filter may correspond to a column of said array. Alternatively, each branch may correspond to a row of said array. Preferably each row of said array represents a parameter of said signal. Alternatively, each column of said array may represent said parameter. Preferably each row or each column corresponds to a different value of said parameter.

According to another aspect of the present invention there is provided a method for processing a signal indicative of the presence of a target or item, the method comprising:
  pre-processing said signal;
  further processing said pre-processed signal using a second order filter;
wherein said filter comprises a plurality of branches, each branch representing an estimate of a second order attribute of said target or item.

Preferably said pre-processing step comprises processing a signal using a first order filter comprises a plurality of branches, each branch representing an estimate of a first order attribute of said target or item.

Preferably said first order attribute is a first derivative of a time variable parameter.

Preferably said second order attribute is a derivative of said first-order attribute.

Preferably said second order attribute is a second derivative of a time variable parameter.

Preferably said second order attribute is acceleration.

By the same token, a third-order attribute may be considered that is rate of change of acceleration or 'jerk'.

Further, by the same token, a fourth-order attribute may be considered that is rate of change of 'jerk', or 'yank'.

Preferably said method comprises using said further processed signal in a classification of said target or item.

According to another aspect of the present invention there is provided a filter for processing a signal indicative of the presence of a target or item, the filter comprising a plurality of branches, each branch representing an estimate of an attribute of said target or item.

Other preferable features of the filter are recited with reference to other aspects of the invention.

In any aspect, preferably the signal is an electromagnetic signal, which may suitably be a return signal from a pulsed radar apparatus. Such apparatus may comprise means (preferably in the form of one or more transmit antennas and associated circuitry) for transmitting a series of pulses to the target or item, and means (preferably in the form of one or more receive antennas and associated circuitry) for receiving the pulses as reflected from the target or item.

Preferably such a filter may be applied in a simplified form, in which the motion considered may be uniform, to all signals received within a period. In this application the presence, position and speed of target or item may be determined.

Preferably for such a simplified form, in which the signal is a conventional pulse-modulated sine wave, the operation may take the form of Fourier analysis to resolve different frequency components. In this case each 'sequence of delay evolution' is represented by the Fourier components. Fourier analysis is computationally efficient for relatively narrowband signals. This aspect is equivalent to conventional Doppler processing.

Preferably for such a simplified form, in which the signal is an ultra-wideband impulse (containing many frequency components), the operation may take the form of a time-domain IIR or FIR filter in which successive delays are applied to the signal by interpolation between finely-spaced time-delayed samples.

Preferably for such a simplified form, in which the signal is a wideband pulse with an identifiable centre frequency but whose bandwidth is too broad to allow simple Doppler discrimination (for example by Fourier analysis), the operation may be a combination of phase-rotation and range interpolation. A detailed implementation will be described in terms of this phase rotation process.

In the case of Fourier analysis, computational efficiency is preferably achieved for signals with a simple spectral description, but with the consequence that the frequency components are evenly spaced and of constant bandwidth. For wideband signals, an advantage of time-related operations is that the operation is more flexible (for example the values of rate of motion can be chosen arbitrarily and the impulse response of a filter can be varied with the rate of motion considered).

Preferably a more general form of the filter may include non-uniform motion. That is, different rates of acceleration may be considered. In the invention, instead of applying such a process to all received signals, which would be extremely intensive, provided that a target or item is detected after the application of the filter in its simplified form, the more general form may be applied only to signals received that are associated with an identified target or item (that is, that occur with a range interval, and within a motion interval, near that of the target or item).

Preferably for an array antenna, an undulation filter is applied to signals representing each element of the array. Advantageously, the undulation filter has the characteristic of preserving delay or phase information contained in the signals. At any stage of the process delay or phase information from each array element may be compared to obtain an angular position estimate for the particular detected target or item or image element.

Preferably the 'target or item' recognized by the sensor is represented by a set of information that includes not only its range, motion, direction and intensity, but also the history of the waveforms associated with it in the period during which it continues to be detected.

Thus an operator may detect, locate, track and image nearby targets, deriving trajectory estimates from earlier stages of signal processing rather than from externally-supplied motion data.

The earlier processing stages are valuable as interim system outputs and lead to higher-resolution 2- and 2.5-dimensional target images.

This will allow moving platforms (for example, terrestrial vehicles, marine vessels, aircraft or spacecraft) to monitor the space surrounding them more effectively and continuously than with a conventional rotating radar sensor.

The avoidance of conventional rotating antennas will reduce cost and the coherent radar signals will allow modern signal processing equipment to be used.

The radar sensor may be small enough to fit within, say, a car bumper or moulding, or behind a non-metallic panel on a moving vehicle, but performs real-time radar functions associated with much larger and more expensive equipment.

Advantageously, the invention may combine real and synthetic apertures either along- or across-track to provide for successively enhanced detection and imaging.

In particular, the invention preferably comprises a two-dimensional radar sensor within a wavelength-scale package on a moving platform which is capable of real aperture, interferometric synthetic-aperture and interferometric inverse synthetic-aperture radar operation, and preferably provides for the detection, positioning, tracking and imaging of obstacles or targets of interest.

The radar signal is processed through a series of approximations followed by data selections, each stage leading to new target information.

In one embodiment, the invention provides a means for the coherent integration of radar signals reflected from objects moving at constant speed.

Preferably, a first moving target indication (MTI) track is obtained for each target by means of the real aperture; higher resolution coherent MTI tracking is preferably provided by first order aperture synthesis; and imaging is preferably provided by second order aperture synthesis.

Targets are imaged separately, allowing for their positions to be retained with minimum distortion.

Phase histories are exploited in a target-specific way to obtain the benefits of all forms of processing for target detection, tracking and imaging.

Furthermore, by collating the history of each target and image, separate targets may be associated in a cluster, and said cluster may be allocated to one of a set of target classes based on its dimensions, image form or motion.

The process of classification of a target can therefore be understood as the application of linear or non-linear filters to target data to determine the target trajectory, followed by the application of logical filters to the target trajectory to interpret said trajectory.

A platform so equipped will be able to monitor its surroundings for hazards, collisions, incursions, unauthorised encounters, positioning, formation guidance, intercept scoring, docking and berthing, parking, refuelling, loading, and to monitor its own position with respect to known targets.

Coherent Integration (First, Second and Higher Order)

According to an aspect of the present invention there is provided a method of processing a signal indicative of the presence of an item, the method comprising: processing said signal using a filter; wherein said filter comprises a plurality of branches, each branch representing a possible attribute of said item. It will be appreciated that each individual branch may be thought of as an individual filter in its own right or simply part of a more complex filter.

Preferably the filter is a first order filter.

Preferably the possible attributes of said item change smoothly with time at a certain rate.

Preferably each branch may represent a different rate of change with time.

According to an aspect of the present invention there is provided a method of processing a plurality of signals indicative of the presence of at least one item, the method comprising: determining a characteristic of each said signal; and coherently integrating said characteristic over a plurality of time separated signals using a filter comprising a plurality of branches, each branch representing a possible attribute of said item; wherein said attribute is of an order higher than first, where 'order' preferably refers to the order of differentiation with time.

The attribute may be a second or higher order attribute, for example a third or fourth order attribute. The attribute may, for example, be an acceleration of the item, a first derivative of acceleration with respect to time (or jerk) of said item, a second derivative of acceleration with respect to time (or yank) of said item or the like.

Coherent integration using filters of this type and in particular higher order filters greatly improves the versatility and effectiveness of such filtering techniques.

According to another aspect of the invention there is provided a method of processing a plurality of signals indicative of the presence of at least one item, the method comprising: determining a characteristic of each said signal; and coherently integrating said characteristic over a plurality of time separated signals using a filter comprising a plurality of branches, each branch representing a possible attribute of said item; wherein said filter is a second or higher order filter and each branch of said filter corresponds to at least a portion of a version of a lower order filter.

This is particularly advantageous because it allows incoming return signals to be filtered across a multiple dimensional surface thereby allowing returns to be distinguished in multiple dimensions. For example, such a filter may be used to resolve items according to a much wider variety of attributes including higher order attributes. Thus, items having different ranges, velocities, accelerations, trajectories, tracks, and/or the like may be resolved. Similarly and even more advantageously, individual components of an object may be similarly resolved to give a characteristic set (or pattern) of responses (for example, the values evolved) on the multi-dimensional surface which can then be classified to allow items or targets to be identified. A human, for example, may have several different components having different first second and higher order attributes (e.g. moving limbs) whilst a vehicle will have fewer. Furthermore, such classification can allow targets to be identified as threats or the like (e.g. a person running as opposed to walking).

According to another aspect of the present invention there is provided a method for processing a signal indicative of the presence of a target or item, the method comprising: pre-processing said signal; further processing said pre-processed signal using a second order filter; wherein said filter comprises a plurality of branches, each branch representing an estimate of a second order attribute of said target or item.

According to another aspect of the invention there is provided a method of processing a plurality of signals indicative of the presence of at least one item, the method comprising: determining a characteristic of each said signal; pre-processing said signal using a first filter; processing said pre-processed signal by coherently integrating said characteristic over a plurality of time separated signals using a second filter comprising a plurality of branches, each branch representing a possible second or higher order attribute of said item; wherein said first filter is of a lower order than said second filter.

This is particularly advantageous because it allows targets to be 'homed' in on before further processing using higher order filters, thereby reducing processing time (and required processing power) significantly by avoiding higher order processing of areas of a multi-dimensional surface which are not of interest.

According to another aspect of the invention there is provided a method of processing a plurality of signals indicative of the presence of at least one item, the method comprising: determining a characteristic of each said signal; and coherently integrating said characteristic over a plurality of time separated signals using a filter comprising a plurality of branches, each branch representing a possible attribute of said item; wherein said filter is adaptive.

Using an adaptive filter allows the filter to be changed in accordance with requirements for example to home in on a particular target according to the location and/or nature of filtered returns exhibited by the filter surface and/or the historical variation of those filtered returns.

According to another aspect of the invention there is provided a method of processing a plurality of signals indicative of the presence of at least one item, the method comprising: determining a characteristic of each said signal and extracting an associated value for said characteristic; and coherently integrating said characteristic over a plurality of time separated signals using a filter comprising a plurality of branches, each branch representing a possible attribute of said item; wherein said integration comprises evolving a value for said characteristic stored in said filter over time in dependence on each successively extracted value, said evolution comprising iteratively attenuating said stored value.

Historically attenuating values helps to reduce the impact of spurious returns (by attenuating the associated values stored in the filter over time). Attenuating the stored values (before taking new data into account) also means that stored values resulting from targets of interest may effectively represent the characteristic of interest coherently integrated over a predetermined number of iterations (i.e. a 'moving integration period'). This 'integrated' value may thus be effectively updated for every new signal (rather than the whole filter being subject to a predetermined number of iterations before subsequent analysis).

The characteristic may be any derivable feature of a signal reflected from a target or item of interest. For example, the characteristic may comprise an amplitude, a phase, and/or a complex number (e.g. representing both amplitude and phase). The characteristic may comprise a frequency domain characteristic of said signal.

The integration step preferably comprises processing the signal using a filter comprising a plurality of branches, each branch representing a possible attribute of said target or item. Each branch may thus represent a different estimate of (or possibility for) the attribute.

The attribute may comprise a physical characteristic of the item or target of interest. For example, the attribute may comprise, inter alia, range rate, hyperbolic track, acceleration (e.g. radial acceleration), trajectory or the like. The attribute may comprise a frequency domain attribute of said item. It will be appreciated that the actual attribute of the target/item may have an absolute value (for example, a constant acceleration, trajectory, track or the like) or may have a value which changes as a function of some other factor (e.g. time, range etc.) such as a hyperbolic track or the like. The branches of the filter may thus represent different possible values of said attribute or different possible functions.

Each branch of the filter preferably comprises a plurality of discrete elements each at a different position in the associated branch. The elements and branches are preferably arranged such that the filter may be visualised as a matrix (or an array) in which each column represents a branch and each row represents elements having corresponding positions across the associated branches (or vice versa).

The parameter preferably comprises a physical characteristic of the item or target of interest which is related to the attribute (preferably a function of the attribute), for example, inter alia, range, phase, range rate or the like. For example, range changes as a function of the range rate, radial acceleration, and/or track etc. of a target/item.

The parameter may thus be a function of the attribute. The parameter may be a track or trajectory of said item.

It will be appreciated that the term 'parameter' and the term 'attribute' have very similar meanings and have each been selected to allow easy distinction between a physical characteristic represented by each branch and that represented by the position of each element within each branch. It will be noted, for example, that mathematically range rate (e.g. radial velocity) is a derivative function of range.

In one preferred example, each branch represents a different estimate of a possible range rate with each element at a position representing a different range. This may be thought of as a first order example in the sense that range rate is a first order derivative of the variation of range with respect to time.

In another preferred example, each branch represents a different estimate of a possible radial acceleration with each element at a position representing a different range rate (and/or range). This may be thought of as a second order example in the sense that acceleration is a second order derivative of the variation of range with respect to time.

Accordingly, one example of a second order filter may thus be visualised as being three dimensional, for example with each second order branch representing a surface comprising a two dimensional array of elements (e.g. range vs. range rate) associated with a different possible second order attribute (e.g. acceleration). Each second order branch may thus comprise a different version of an entire first order filter. Each branch of a three dimensional second order filter may of course comprise a refined version (e.g. a selected part) of the associated first order filter (e.g. a selection of first order branches and/or element positions). This may advantageously reduce processing time.

Another example of a second order filter may be two dimensional, for example with each second order branch representing a different version of a single branch or element position (i.e. a first dimension) of the first order filter. Each version of the single branch or element position may thus be associated with the different possible second order attribute (i.e. a second dimension). Using a two dimensional version of the second order filter may thus advantageously reduce processing time over a full three-dimensional version.

A second order filter of this type may, for example, comprise a surface parameterised by (radial) acceleration (or any other second order attribute) and another lower order parameter preferably, for example, range rate or possibly range if appropriate.

In another preferred example, each branch represents a different estimate of a third-order attribute, for example the rate of change of acceleration (which may be referred to as 'jerk' by those skilled in the art) with each element at a position representing a different acceleration (and/or range rate and/or range). This may be thought of as a third-order example in the sense that acceleration is a second order derivative of the variation of range with respect to time.

The third-order filter may of course be treated four dimensionally with each third-order 'branch' representing a three-dimensional array (e.g. different versions of all or part of a second order filter) if processing power allows. Advantageously, however, (to reduce processing power) each branch may represent a carefully selected two-dimensional array or 'surface', or even a single dimension array or 'column'.

In yet another preferred example, each branch represents a different estimate of a fourth-order attribute, for example the rate of change of 'jerk' (which may be referred to as 'yank' by those skilled in the art). It will be evident to those skilled in the art that the above principles may be applied to the fourth-order filter and even higher order attributes, with each higher order branch being a version of a lower order filter (which may be refined to reduce processing power).

The coherent integration may comprise evolving a value for said characteristic stored in at least one said branch iteratively over time in dependence on a value of said characteristic extracted for each time separated signal. The integration may comprise evolving a plurality of stored values for said characteristic over time in dependence on said extracted values of said characteristic, each evolving value being stored at a different location in said filter.

Each branch preferably comprises a plurality of elements the position of each element may be associated with a different possible value of a parameter related to said item. Each element may have a position determined by the parameter. A value for said characteristic may be stored in an element in every branch or may be stored in an element in a range of branches (or even a single branch).

Each stored value may be stored in an element determined by said parameter for said item. In other words the stored value may be stored within each branch at a location dependent on the parameter (for a particular iteration or time interval). For each time interval the method may comprises predicting said parameter for the next time interval for each branch, based on the possible attribute associated with that branch. For example, a range parameter may be predicted for an attribute such as velocity (or range rate) based on the different possible range rates estimated for each branch.

The filter may be iteratively adapted in dependence on said predicted parameter, for example by moving a value from a first element in each corresponding branch to a second element in dependence on said predicted parameter. For example, in a particular branch, stored values representing an integrated characteristic (e.g. amplitude) for received signals may be moved from a position representing a first parameter (e.g. initial range) to another location within the branch represented by the predicted parameter (i.e. the range if the attribute associated with that branch is correct).

For each time interval, each value stored in an element for which the parameter predicted in the previous time interval does not substantially match the parameter (of the item) for the current time interval may be attenuated.

For each time interval, each value stored in an element for which the parameter predicted in the previous time interval does substantially match the parameter for the current time interval is evolved in dependence on an extracted value for said characteristic.

Hence, the stored values for correct (or closest) predictions may be integrated with the value extracted during the next time interval. The stored values for incorrect predictions may be attenuated (or even reset according to the history of the stored value).

The coherent integration may comprise summing at least a proportion of the characteristic for an earlier time separated signal with at least a proportion of the characteristic for a later such signal.

The coherent integration may comprise averaging the characteristic over said plurality of time separated signals. The average may be a moving average.

The phase of said signal may be stored as may the amplitude or any other characteristic.

Preferably each branch of said filter corresponds to at least a portion of a version of a lower order filter.

Each branch of the second or higher order filter preferably represents just a portion of said lower order filter (thereby reducing processing intensity). The precise size and/or configuration of the portion of the earlier filter may vary in dependence the results of earlier filtering. For example, a larger portion may be preferred where lots of targets having very different attributes have been identified. A smaller portion may be desirable for a single target having components having similar attributes (e.g. range rate/velocity).

The actual portion may represent an optimised selection of an odd number of branches for example at least three (maybe five or seven) branches of said lower order filter. The actual portion may represent an optimised selection of an odd number of rows for example least three (possibly five or seven) rows of said lower order filter. The portion may represent at least three elements within each branch of said lower order filter (for example, the portion may comprise a three by three section of the lower order filter). Although it will be appreciated that in some arrangements an even number (for example 2, 4, 6 or 8) may be selected. An odd number advantageously allows the filter to be centred optimally (for example, on a cell or element of the filter in which a target/item has been located).

The second or higher order filter may comprise a branch representing an optimum selection of said possible second or higher order attribute. The second or higher order filter may comprise at least one branch representing a selection of said possible second or higher order attribute on either side (i.e. one or both sides) of said optimum selection (for example, the higher order filter may be adapted in dependence on the filtered contents and may comprise just three branches).

The higher order filter may thus comprise, for example, at least a three by three cubic surface characterised by three possible higher order attributes (branches of the higher order filter), three possible lower order attributes (branches of the lower order filter), and three possible parameters (rows/surfaces) for the item.

The signal may be pre-processed using a lower order filter before said coherent integration preferably using a higher order filter.

The lower order filter may comprise a plurality of branches, each branch preferably representing a possible lower order attribute of said item, and said pre-processing step may comprise coherently integrating said characteristic over a plurality of time separated signals using the lower order filter.

Preferably said pre-processing step comprises processing a signal using a first order filter comprising a plurality of branches, each branch representing an estimate of a first order attribute of said target or item. Preferably said first order attribute is a first derivative of a time variable parameter.

The lower order attribute may be a lower, for example first, order attribute comprising a first derivative of a time variable parameter. The second or higher order attribute may be a derivative (first/second or higher) of said first order attribute.

The lower order filter and/or attribute may be a first order filter and/or attribute.

The filter may be adaptive. For example, it may have an adaptive configuration in which: the resolution of the filter may be adaptive (e.g. in dependence on a detected presence of said item thereby to home in on said item); the width (e.g. the range of the associated possible attribute associated with the branch) of each branch may be adaptive; and/or the number of branches/rows may be adaptive.

Preferably, the filter may be parametrically adaptive. The filter may, for example, have a configuration which changes in dependence on any attribute (or parameter) of a detected item or target, for example to provide a higher resolution filter for resolving targets/items (or components thereof) having similar attributes (e.g. similar velocities or range rates). The values evolved (i.e. integrated) by the filter may be fed back into the filter, the configuration of the filter being adapted accordingly. This may happen during the filtering process possibly for each iteration.

The possible attribute to which each branch relates may be adaptive (for example to fine tune the filter to a group of items for which the filter attribute is similar or to extend the search field to a wider range of possible attributes). For example, if several targets are moving at similar but not identical range rates the estimate of range rate associated with each branch may be adjusted accordingly.

The filter may be adaptive based on the or a further attribute of said item. The filter may, for example, be adaptive based on the acceleration of the item. The filter may be adaptive based on a frequency domain attribute of said item. The filter may be adaptive based on the range rate of the item (for example to use a filtering arrangement optimised to the speed or acceleration of the item).

The filter may comprise adaptive contents, for example, based on the possible attribute. The location of the contents within the filter may be adaptive. Each branch includes may include a plurality of adaptive elements.

The filter preferably comprises adaptive contents, the integration comprising adapting the contents by preferably evolving a value stored in said filter, the evolution preferably comprising iteratively attenuating said stored value.

The stored value may represent a time evolved version or coherently integrated version of said characteristic. The evolution may comprise summing at least a proportion of said extracted characteristic value with the attenuated value. The evolution may comprise iteratively replacing the stored value with the evolved value.

The iterative attenuation may comprise multiplying said stored value by a first factor. The extracted characteristic value may be multiplied by a second factor, the summation preferably comprising summing the result with said attenuated value. The second factor may be equal to one minus said first factor.

The first factor may be defined by the equation:

$$MF = \left(1 - \frac{1}{n}\right)$$

where MF is the first factor and n preferably represents a number of signals over which said extracted characteristic is effectively integrated.

The factor is preferably less than 1, for example a scalar between 0 and 1, for example 0.99, or 0.9.

The first factor may be defined by a function parameterised by the attribute for each branch (for example, a different factor may be used for different attributes and or parameters). The first factor may be defined by an array. The first factor may of course be constant for the whole filter or just a part thereof.

The factor may vary linearly across the branches or may vary non-linearly across the branches. Every branch, a selection of branches, or just a single branch of the filter may be evolved.

The filter may comprise a first, second, third, fourth, or higher order filter (or a combination thereof. The filter may comprise an undulation (or migration) filter.

The filter may comprise an array. Each branch of said filter may correspond to a further array (as discussed above with reference to higher order filters). Each branch of said filter may correspond to a column of said filter array. Each row of said filter array may represent a parameter relating to said item, each row may represent a different value of said parameter.

A trajectory may be derived from said method. The method may comprise resolving a plurality of items by analysing a time evolved form of said filter. Each item may be resolved by determining the location of a response (for example, a time evolved value) at particular location within the filter.

The method may comprise determining a specific branch of the filter in which a response is located, and preferably determining a derived attribute of said item as being equivalent to the possible attribute represented by the specific branch. The response is preferably detected using a peak detector.

The item may be classified depending on said derived attribute. The filter may be evolved to contain at least one cluster of responses each cluster characterising a single item. The item may be classified depending on said cluster. Said target or item may be an item having components moving at the same or at different velocities. Said target or item may be an object having components located at different ranges.

Preferably said method comprises classifying said object depending on said cluster.

An attribute derived from said method may be applied to an imaging process. The method may comprise varying said derived attribute to optimise said imaging process. The method may comprise deriving an image from said imaging process. The method may comprise adapting said filter in dependence on said imaging process.

The filter may be adapted by modifying the possible attribute represented by at least one branch.

The method may comprise iterating said application of said derived attribute, said imaging process and/or said adaptation of said filter.

A parametric definition may describe a multi-tap version of said filter. Each tap may be described by a transformation, may lead to higher-order filters, or may lead to band pass filters.

In a preferable adaptive implementation of the filter the parameters for each cell of the data array may depend on the characteristics of a target found in that cell or possibly near by or adjacent cells (i.e. may depend on its position or history). The parameters may be reset if there is no detection within that cell (or possibly nearby or adjacent cells).

According to another aspect of the invention there is provided a filter for processing a signal indicative of the presence of an item, the filter comprising a plurality of branches, each branch representing a possible attribute of said item wherein said attribute is of an order higher than first.

According to another aspect of the invention there is provided a filter for processing a signal indicative of the presence of an item, the filter comprising a plurality of branches, each branch representing a possible attribute of said item wherein said filter is adaptive.

According to another aspect of the invention there is provided a filter for processing a signal indicative of the presence of an item, the filter comprising a plurality of branches, each branch representing a possible attribute of said item wherein said filter is evolvable over time.

According to another aspect of the invention there is provided a filter for processing a signal indicative of the presence of an item, the filter comprising the features of the filter used in any of the method or apparatus aspects.

According to another aspect of the invention there is provided apparatus for processing a signal indicative of the presence of an item, the apparatus comprising: means for processing said signal using a filter according to any filter aspect using a method according to any method aspect.

According to another aspect of the invention there is provided apparatus for processing a signal indicative of the presence of an item, the apparatus comprising: means for determining a characteristic of each said signal; and means for coherently integrating said characteristic over a plurality of time separated signals comprising a filter having a plurality of branches, each branch representing a possible attribute of said item; wherein said attribute is of an order higher than first.

Preferably said filter comprises a second or higher order filter preferably corresponding to at least a portion of a version of a lower order filter.

According to another aspect of the invention there is provided apparatus for processing a signal indicative of the presence of an item, the apparatus comprising: means for determining a characteristic of each said signal; and means for coherently integrating said characteristic over a plurality of time separated signals comprising a filter having a plurality of branches, each branch representing a possible attribute of said item; wherein said filter is a second or higher order filter and each branch of said filter corresponds to at least a portion of a version of a lower order filter.

According to another aspect of the invention there is provided apparatus for processing a signal indicative of the presence of an item, the apparatus comprising: means for determining a characteristic of each said signal; and means for coherently integrating said characteristic over a plurality of time separated signals comprising a filter having a plurality of branches, each branch representing a possible attribute of said item; wherein said filter is adaptive.

According to another aspect of the invention there is provided apparatus for processing a signal indicative of the presence of an item, the apparatus comprising: means for determining a characteristic of each said signal and extracting an associated value for said characteristic; and means for coherently integrating said characteristic over a plurality of time separated signals comprising a filter having a plurality of branches, each branch representing a possible attribute of said item; wherein said integration comprises evolving a value for said characteristic stored in said filter over time in dependence on each successively extracted value, said evolution comprising iteratively attenuating said stored value.

Preferably the apparatus comprises: means for transmitting a series of pulses to an item; means for receiving reflected pulses, said signal comprising a reflected pulse received from said item.

The transmitting means may comprise at least one transmit antenna. The receiving means may comprise at least one receive antenna.

Preferably the apparatus comprises a plurality of said receive antennas. The plurality of said receive antennas may be arranged along the direction of travel. The plurality of said receive antennas may be arranged transverse to the direction of travel. The plurality of said receive antennas may be arranged across a principal look direction of said receiving antennas. Each receive antenna may be provided with a corresponding filter according to any preceding filter aspect.

According to another aspect of the invention there is provided a method for reducing the effect of interference comprising unwanted signals received in an item detection system, the method comprising: setting a detection threshold for a characteristic value of received signals; extracting said characteristic value from each received signal; identifying signals having an extracted characteristic value below said threshold value as being interference; wherein said threshold value is adapted over time in dependence on the extracted characteristic values of said received signals.

The threshold value may be set to a first value and adapted over time to a second value. The first value is preferably higher than the second value. The second value preferably represents a long term threshold value of said system. The threshold value may be dependent on a range determined for each received signal.

The method may comprise forming a model of said interference and subtracting said model from received signals to reduce the effect of said interference.

The model may be adapted over time in dependence on said signals received by the system.

According to another aspect of the invention there is provided a method for reducing the effect of interference comprising unwanted signals received in an item detection system, the method comprising: forming a model of said interference; subtracting said model from received signals to reduce the effect of said interference; wherein said model is adapted over time in dependence on signals received by the system.

The method may comprise suspending said adaptation on detection of an item of potential interest.

The methods for reducing the effect of interference may be used as a pre-processing step to a method according to any aspect of the invention.

A preferable embodiment of the invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

A preferable embodiment of the invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

A preferable embodiment of the invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa. Again, migration aspects may be combined with target classification, perimeter definition and 3D-radar link to vision aspects.

Furthermore, features implemented in hardware may generally be implemented in software, and vice versa. Any reference to software and hardware features herein should be construed accordingly.

According to the present invention, there are provided methods, systems and apparatus and a filter as set out in the corresponding independent claims. Other preferable features of the invention are recited in the dependent claims.

These and other aspects of the present invention will become apparent from the following exemplary embodiments that are described with reference to the following figures in which.

OVERVIEW

Figure 1:
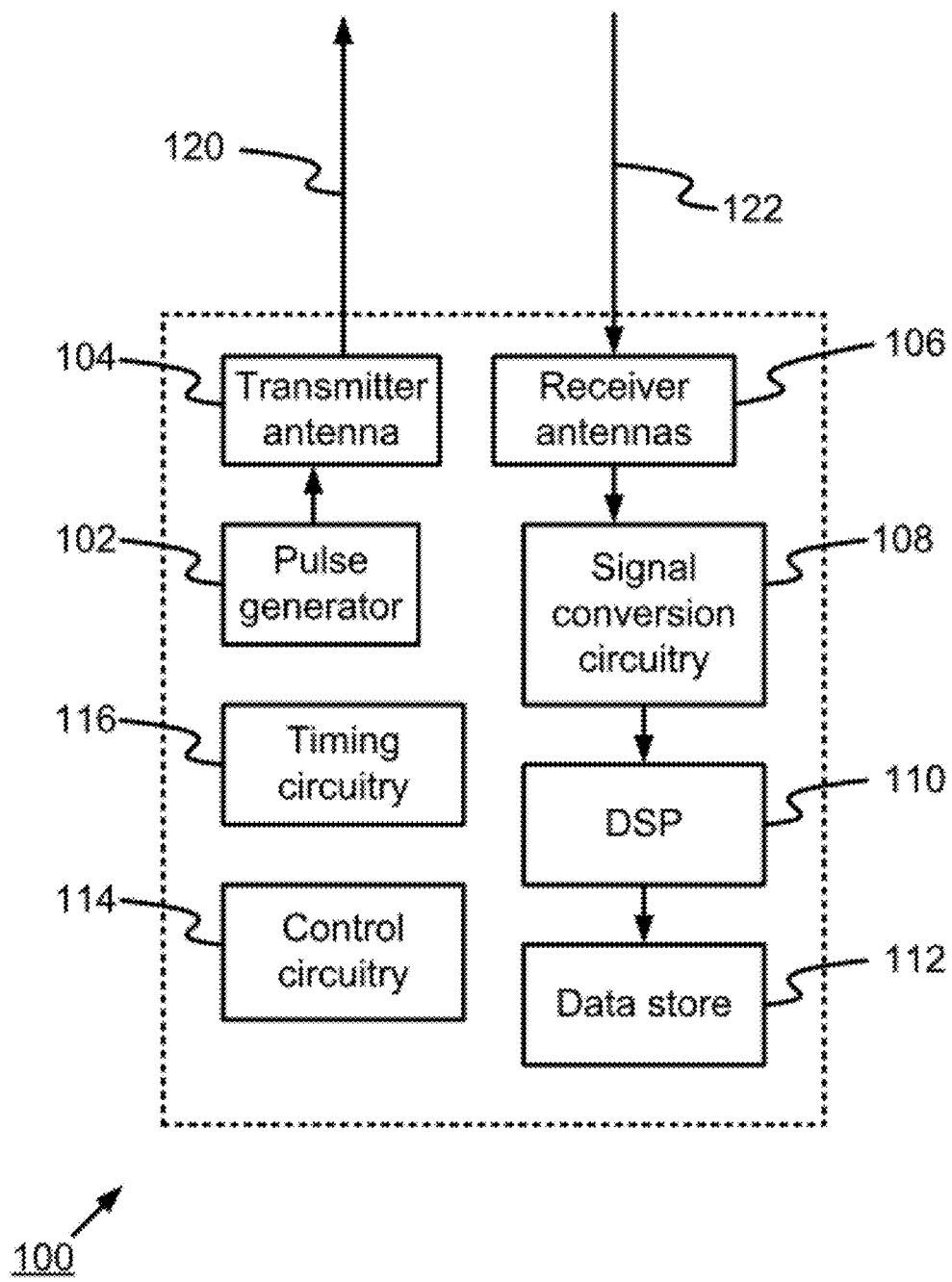
FIG. 1 is a representation of a simplified overview of the main circuit elements of an embodiment of the invention.

In FIG. 1 a radar system suitable for use with an embodiment of the invention is shown generally at 100. The radar system comprises: a pulse generator 102, to provide coherent radar pulses 120; a 2-D antenna array, comprising transmitter 104 and receiver 106 antennas; timing 116, control 114, receiving and conversion circuitry 108; a digital signal processing device 110 and a data store 112. The radar system is configured to transmit the radar pulses 120 and to receive and process reflected pulses 122 reflected from a target.

The antenna array comprises multiple receiving antennas and at least one transmitter antenna mounted on a platform. The platform is typically a movable platform, and may for example comprise part of a terrestrial vehicle such as an automobile, a marine vessel such as a ship, an aircraft or alternatively a spacecraft.

The receiving antennas each have dimensions typically of the order of half the wavelength of the transmitted signal and are spaced apart along or transverse to the direction of travel and across the principle look direction, in known relative positions.

Figure 2:
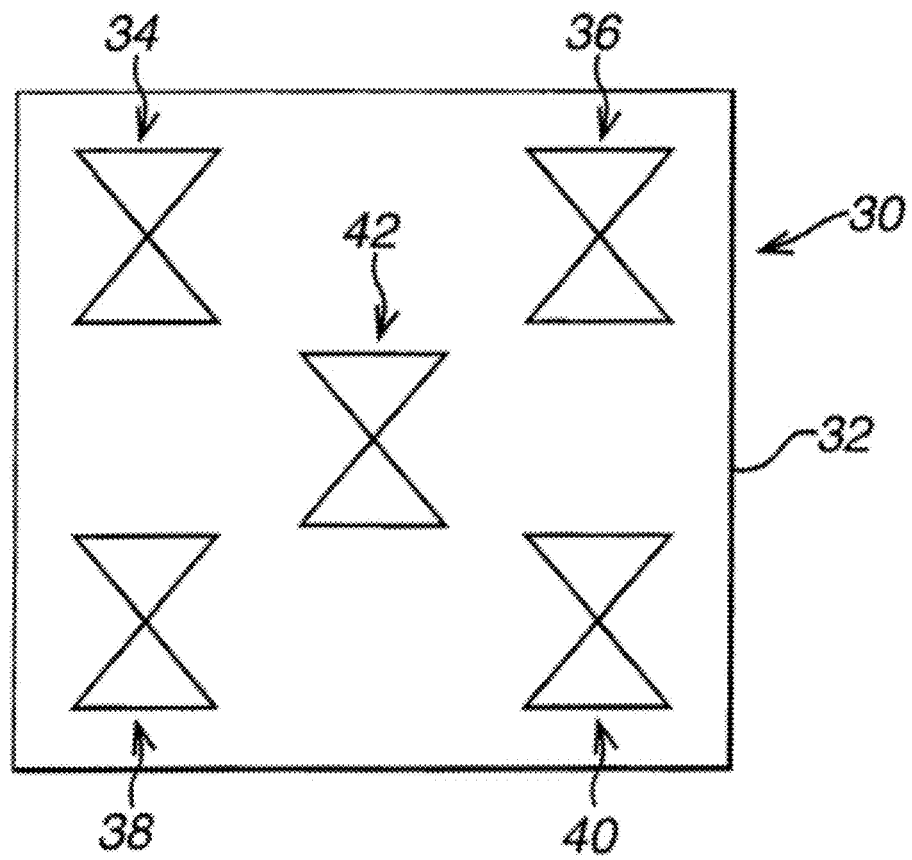
FIG. 2 is a representation of an antenna array of transmitting and receiving elements being a component of an embodiment of the invention.

With reference to FIG. 2, there is shown a diagrammatic representation of an antenna array 30 suitable for use in an embodiment of this invention.

The antenna array 30 is constructed on a substrate 32. The substrate may be a block of plastic or glassfibre composite material having a flat supporting surface or one that conforms with known geometry of the supporting platform. In order that embodiments of the invention are available for use where space is restricted, the antenna array may be compact, for example, for a wavelength of 5 cm having a peripheral size of approximately 10×12 cm. Antenna elements are formed on the supporting surface of the substrate as conductors printed onto the surface. The antenna elements may be dipoles (for example, bow-tie dipoles), TEM horns, microstrip patches, stacked patches, or any other compact element or conductive structure suitable for operating at the required signal frequency.

In this embodiment, the array 30 has five antenna elements in total. Four of these elements are first, second, third and fourth receiving elements 34,36,40,38 although other numbers of receiving elements, such as two, three, four or more, may be provided. The fifth element is a transmitting element 42. The receiving elements 34,36,38,40 are disposed at the vertices of a trapezium-shaped (which may, in a special case be rectangular) locus, and with more elements these could be disposed at the vertices say of a trapezoid or an irregular planar locus. In the case of a three-dimensional substrate they may be at the vertices of a cuboid or other solid form. The transmitting element 42 is disposed at the centre of the same locus.

For many applications, the size of the antenna array must be kept to a minimum. For example, the spacing between the elements may be in the order of no more than a few half-wavelengths. For example at an operating frequency of 6 GHz, spacings may be a few centimeters, say between 1 and 10 cm, preferably between 2 and 8 cm. A hypothetical axis corresponding to the axis 20 discussed with reference to FIG. 2 can be considered to extend normal from the supporting surface through the centre of the transmitting element 42. For reference below, the spacing between the first and second receiving element will be denoted D12, the spacing between the second and third receiving element as D23, and so forth.

As a specific example, if the apparatus is designed for operation with signals of frequency in the region of 6.5 GHz, the antenna elements may be dipoles of approximately 18 mm in length, and may be fed with a balanced line feed.

In an alternative form of construction, the antenna elements may be located within a dielectric radome.

Associated signal processing circuitry may also be located within the radome in order to provide the apparatus as a self-contained package.

Figure 3:
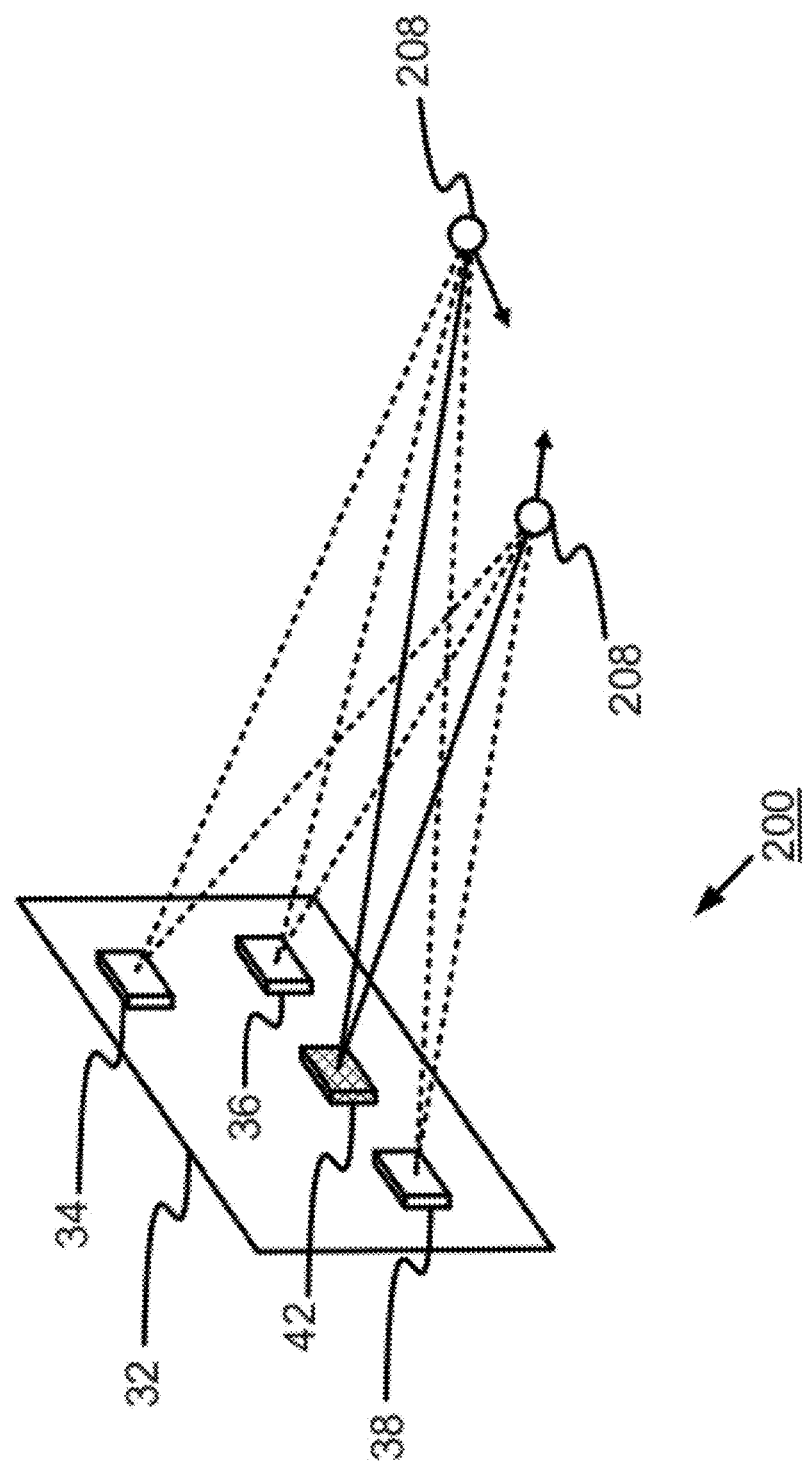
FIG. 3 is a representation of an alternative antenna array of transmitting and receiving elements being a component of an embodiment of the invention.

It will be appreciated, that the array may comprise any suitable configuration. An example of an alternative configuration of the array is shown in FIG. 3, in operation tracking multiple targets 208. The configuration is generally similar to that disclosed with reference to FIG. 2 and like parts are given like reference numerals.

Figure 4:
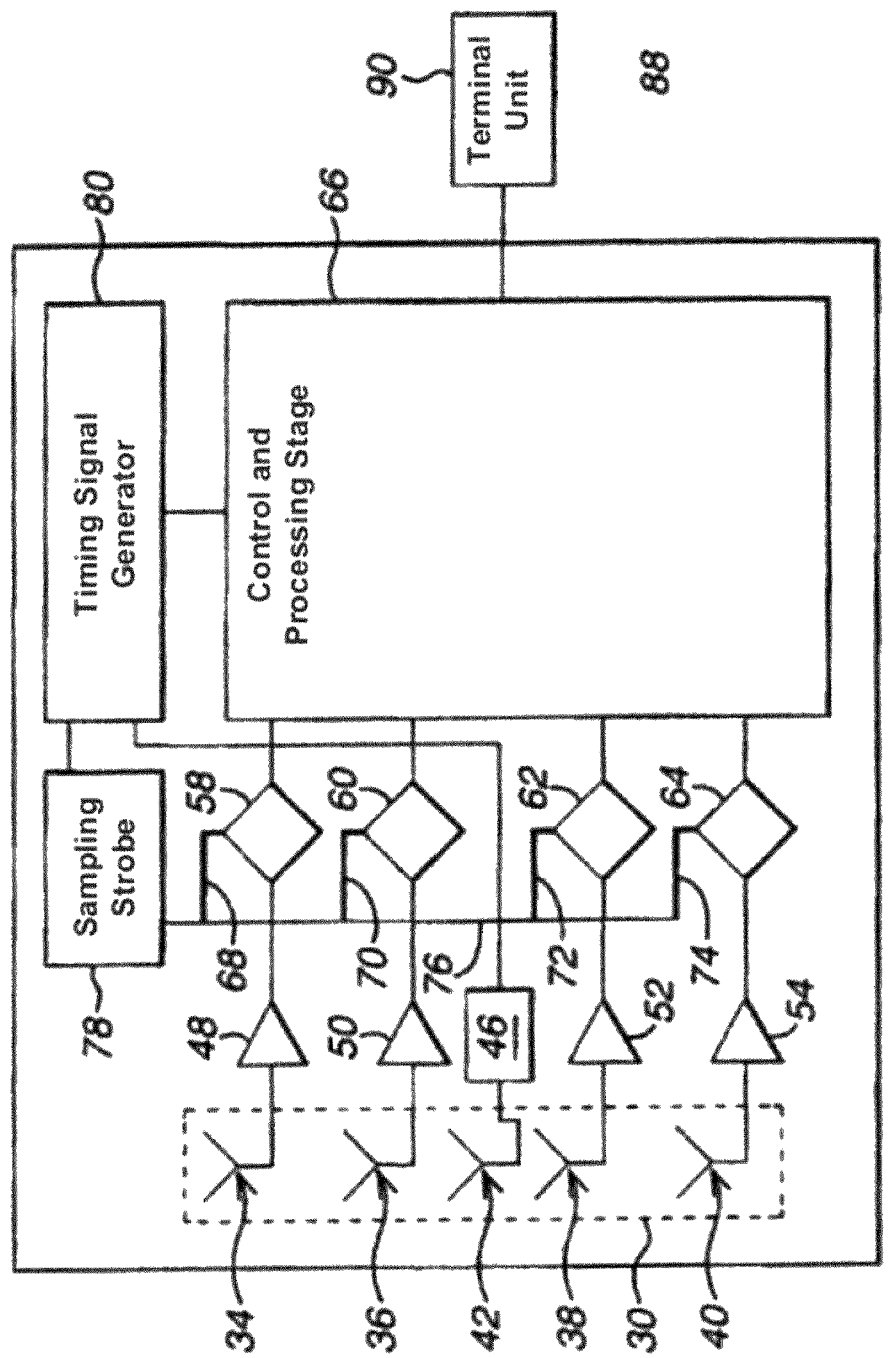
FIG. 4 is a representation of the main circuit elements of an embodiment of the invention in more detail.

Turning now to FIG. 4, the circuit elements of the apparatus embodying the invention will now be described in more detail.

The apparatus includes a control and processing stage 66 that controls the operation of other components of the apparatus. The control and processing stage 66 has a data output that sends data relating to the position of one or more objects located within the detection field of the apparatus. Such data may be received by a terminal unit 90, possibly including an alarm, for further processing, for display to a user, and/or for transmission to a remote system; as required in any particular application.

A pulse generator and filter stage 46 is connected to the transmitting element 42 of the array 30. The pulse generator may, for example, be implemented using step-recovery diodes ("SRDs"), GaAsFETs, or SiGe transistors, the aim being to produce a pulse waveform whose shape and frequency are controlled and filtered before transmission to generate the transmitted signal. Preferably, the rise and fall time of the waveform, after appropriate pulse shaping, compression or carrier suppression, may be less than 0.5 ns, 1 ns, 2 ns or 4 ns. Each of the receiving elements 34,36,38,40 of the array 30 is connected to a respective filtering and amplifying stage 48,50,52,54. The received signal is filtered to generate the output signal. The filtering stages 46,48,50,52,54 include a bandpass filter in the signal path from the transmitter to the transmitting element 42 and from the receiving elements 34,36,38,40 to the receiver circuitry. Filtering is a standard technique used to ensure that the generated signal is suitable for the antennas, and for compliance with regulatory requirements.

Sampling Circuitry and Delay Lines

Signals from each of the filtering and amplifying stages 48,50,52,54 are fed to a signal input of a respective switched sampling or mixing stage 58,60,62,64. The output of each switched sampling or mixing stage 58,60,62,64 is connected to a respective input of the control and processing stage 66. Each switched sampling or mixing stage 58,60,62,64 has a gate input, which, when activated by a suitable signal, passes signals related to the input line onto the output line. Each of the gate inputs is connected through a respective delay line 68,70,72,74 to a common strobe or local oscillator line 76. The strobe line 76 is fed with signals from a sampling strobe or local oscillator signal generation stage 78. Each of the delay lines 68,70,72,74 imposes a delay as near as possible identical to each other on signals. The delay lines 68,70,72,74 may be constructed as lumped capacitors and inductors, but more preferably are equal lengths of printed transmission line of length Ld.

A timing signal generator 80 of the apparatus has two output lines 82, 84. A first of the output lines 82 is connected to a control input of the pulse generator and filter stage 46. A second of the output lines 84 is connected to a control input of the sampling strobe or local oscillator signal generation stage 78. A control input of the timing signal generator 80 receives signals from the control and processing stage 66. The timing signal generator 80 operates to generate pulses at both the transmitter trigger instants and the receiver trigger instants.

In this embodiment, the timing signal generator 80 includes an oscillator and logic components. The oscillator includes a crystal-controlled clock, an output of which is fed to the logic components. Upon initiation of a timing cycle, the logic components may use the signals received from the clock to generate a linear ramp signal. The linear ramp signal is fed to one input of a fast comparator, the other input of which is fed with an external voltage source. The comparator has an output upon which a signal is generated that is indicative of the relative magnitudes of the signals on its two inputs. Thus, the signal on the output changes its state after the initiation of a ramp cycle at a time interval which is dependent upon the external voltage. The timing signal generator 80 stage is configured to generate a signal on its first output line upon initiation of the timing cycle, thereby creating a transmitter trigger instant, and on its second output line upon the change of state of the comparator output thereby creating a receiver trigger instant.

Alternatively, two comparators may be provided, each of which has one input connected to a different external voltage source, and the other input connected to the ramp signal.

The first comparator generates an output signal when the ramp exceeds a first voltage, thereby creating a transmitter trigger instant, and the second comparator generates an output signal when the ramp exceeds a second voltage, thereby creating a receiver trigger instant.

In this way, even if the ramp signal drifts up or down, the interval between the transmitter trigger instant and the receiver trigger instant will remain constant.

In an alternative embodiment, the timing signal generator includes first and second crystal-controlled clocks, the second operating at a frequency slightly below that of the first. Thus, there is a slow variation in phase between the two clocks, whereby a slowly varying time delay can be generated.

In a further alternative embodiment, the timing signal generator includes a high-frequency crystal-controlled clock, whose successive periods are separated such that by counting successively increasing numbers of such periods, the interval between transmitter trigger and receiver trigger may be varied.

Any of the above-described embodiments (more straightforwardly in the case of the former) permit and allow random or quasi-random variation in the timing of the transmitter and receiver trigger instants. This may be achieved, for example, by phase modulation of the timing signals, level shifting of the ramp, time modulation of initiation of the timing cycle or random signal inversion.

In alternative embodiments, the switch or mixer circuits may operate independently or be triggered in common. During post-processing of the signals, symmetrical leakage signals between the transmitting element 42 and the receiving elements 34,36,38,40 can be used to correct for any differences between the timing of the various switched sampling stages 58,60,62,64.

A most important consideration in the design of the timing and sampling stages is that inter-channel timing errors are minimised so that an accurate comparison can be made of the times at which signals are received by the various channels. This is because the preferred technique for determining location of a target involves a process of trilateration using the differential delay between the receiver pairs.

The filter stage 46 is designed to ensure that the signal fed to the transmitting element 42 causes signals to be radiated that meet appropriate regulatory requirements, for example, in respect of their power and/or frequency, and to ensure that the signals are unlikely to interfere with nearby equipment such as communication or sensing devices. The filter stage 46 may be implemented using a known broadband amplifier, associated with microstrip or lumped-element filters, selected to pass signals of frequency in the operating range of the device.

The switched sampling or mixer stages may suitably be implemented using switching diodes such as Schottky diodes.

These may be configured in, for example, a bridge arrangement well-known to those skilled in the technical field, and the sampling or local oscillator signals are configured to be triggered by pulses generated by the timing signal generator 80.

The control and processing stage 66 is constructed in accordance with the specific requirements of the particular application in which an embodiment of the invention is to be used.

In a typical embodiment, the form of the transmitted signal and sampling of the reflected signals is arranged to operate in a sweeping range gate method. The signal generating stage is configured to apply a series of m pulses to the transmitting element to cause it to transmit a sequence of pulses, with pulses at times $t_n$ where n=1, 2. . . m, such that at least a portion of the signal can be reflected from the object to be received by the receiving elements; and the detection stage detects a signal reflected to the receiving elements at times $r_n$ and generates an output signal representative of the received signal; wherein the value of $r_n-t_n$ varies as some function of n.

By this arrangement, the flight time of a detected signal can be determined given only the knowledge of the value of n at which it was received and knowledge of the function of n.

For example, it may be that the value of $r_n-t_n$ changes linearly with n, or it may vary in some other manner, for example in a pseudo-random sequence.

In a typical embodiment, the value of $r_n-t_n$ increases or decreases linearly with n, by which it will be understood that the delay between a transmit time $t_n$ and a corresponding receive time $r_n$ increases or decreases linearly with n. Preferably, the delay varies from one pulse to an adjacent pulse; this can be a convenient way of putting the invention into practice. Although in one preferred embodiment the delay varies with each successive pulse, this is not necessarily the case; a first series of pulses at a first delay may be followed by a second series of pulses at a second, different, delay, and more than two different delays may be used. It will be appreciated that usually the delay is considered to be the delay with respect to the time at which the relevant pulse is transmitted.

In a yet further embodiment, the detection stage is operable to detect the reflected signal during a detection aperture period, which is shorter than (preferably very much shorter than) the time between successive pulses.

In the ways described above, one or more (if a plurality of detection aperture periods is provided) moving range gates may be provided.

Operation

Figure 5:
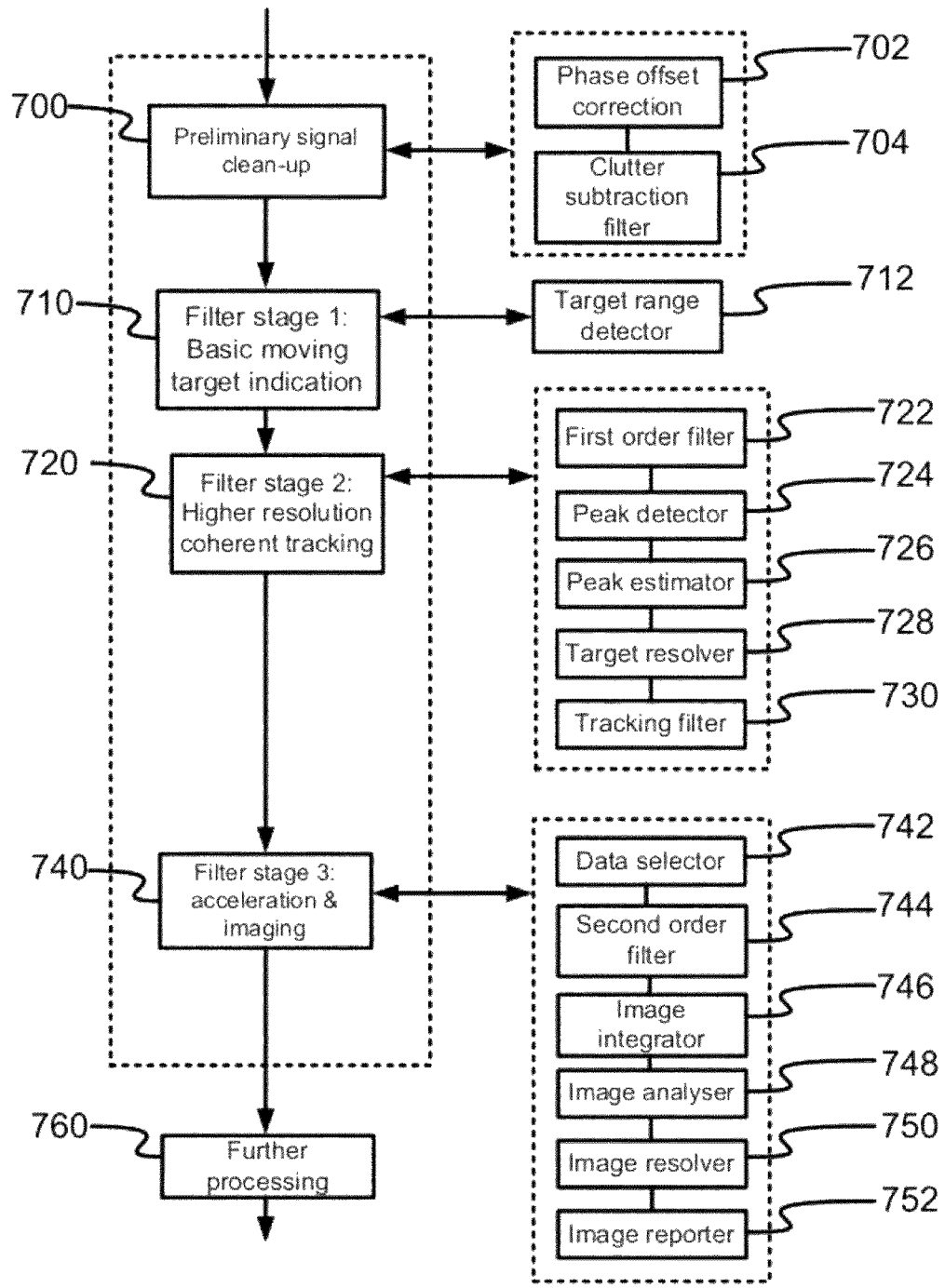
FIG. 5 is a is a simplified flow diagram of the processing steps carried out by apparatus embodying the invention.

Referring now to FIG. 5, in operation, a series of signal pulses are transmitted which interact with any targets present, are reflected back and received by the sensor, sampled, stored and then processed.

The transmitted pulses have a centre frequency $f_c$ and are repeated at a pulse repetition interval (PRI).

The received signal comprises a series of wideband pulses, weaker than the transmitted pulses, reflected from one or more targets.

In another embodiment, the received signal comprises a series of pulses, weaker than the transmitted pulses, reflected from one or more targets and such pulses are sufficiently wideband to provide adequate target resolution.

In this embodiment, the signal may be received from directions close to the direction of motion of the sensor, rather than primarily from a side-looking direction as is typical in prior art systems as described above.

In a radar sensor the signal received at each antenna element typically undergoes analogue frequency down-conversion as described, prior to analogue-to-digital conversion to enable the subsequent digital signal processing according to the following steps.

Preliminary Signal Clean-Up

The received signal is first cleaned of errors, extraneous signals and interference. This is achieved by first applying phase offset corrections for the antenna array and then further by removing unwanted signals or "clutter".

Phase offset corrections are applied at 702 to compensate for fixed-phase offsets between the receiving elements. Components associated with each elementary antenna channel may have small unknown propagation delay characteristics with respect to the received signal. By testing the sensor with a known target in a known position, and comparing the phase values observed at each element for that target, these delays can be measured and stored. They can then be corrected for in the course of calculating the positions of unknown targets.

It is envisaged that this 'calibration' step will have been performed as a one-time procedure before the system is deployed.

Clutter Reduction, Target Protection and Thresholding

The clutter subtraction filter 704 provides the ability to resolve real targets from static sources of interference. This interference may be caused by reflection from targets of no interest, such as parts of the platform, or from propagation within the circuits of the radar itself. These signals are generally referred to collectively as "clutter".

If these unwanted reflections are described by amplitudes and delays that are fixed, or whose rates of change can be distinguished from those of targets of interest, they can be measured, stored, and subsequently compensated for by subtraction or filtering out from the later received signals.

A range of methods are available to avoid detection and reporting of the unwanted signals comprising clutter including:

(a) increasing detection thresholds to values that are known to protect the radar detection system;
(b) recording signals in a situation where there is known to be an absence of real targets;
(c) distinguishing between wanted and unwanted targets on the basis of changes in the signal or Doppler frequency shifts.

Method (a) has the disadvantage that it will reduce the sensitivity of the radar at ranges where these responses occur. Method (b) is problematic for two reasons: firstly the unwanted responses may not be sufficiently stable for a once-for-all mapping to give adequate protection, and secondly because it is undesirable to require repeated clutter acquisitions in "empty field" conditions. Method (c) has the disadvantage that a fixed target of potential interest will eventually be rejected.

An embodiment of an improved clutter rejection process which combines features of methods (a), (b) and (c), whilst mitigating against the above issues will now be described, by way of example only.

For the clutter rejection process to be most effective the sensor is designed and installed so as to generate: the lowest possible level of clutter; clutter that decays as fast as possible with range; and clutter signals that are as stable as possible with regard to time and temperature.

Nevertheless, the degree to which these features may be implemented is limited by the fact that the sensor must use low cost components and techniques.

According to an exemplary embodiment of the process, at least one clutter replica is stored and a best fit (after adjusting for delay) is subtracted from the received signal. The detection threshold has a long-term value that is set specifically for each range value.

The threshold is increased, especially at short ranges, when the radar is initially turned on, so that residual mismatches between the received signal and the best fit stored replica will not result in false detections.

Provided that no detections occur, the replica is then adjusted to match the average received signal at each range. As the adjustment progresses, the threshold is allowed to converge to a long-term value using an appropriate time-dependent formula.

When a detection occurs, and within a range interval that will include the whole target return, the process of adaptation is suspended. Hence, actual fixed targets of potential interest are protected from the clutter adaptation process.

An initial "most probable form" of the clutter signal is acquired and stored when the radar is first installed, and is under "empty field" conditions.

In the case of a moving platform on a vehicle or the like, the initial form of the clutter signal may be re-acquired or learned when the vehicle is in forward motion and no targets are detected.

Alternatively, received clutter signals may be used to assemble a model of the clutter signals and their behaviour with time and variations in temperature. In this case detection may be carried out without making reference to a device and installation specific stored replica.

Thus, a wide range of variation of clutter can be accommodated, while sensitivity is maintained for a majority of scenarios. In the case where a target is missed because of the initially increased threshold, relative motion of the sensor array with respect to the target will result in its detection once motion begins.

The clutter reduction processes described advantageously provides a combination of sensitivity and low false alarm rate.

In another embodiment, the clutter signal to be subtracted is formed exactly as a zero-range-rate branch of the first order undulation filter described below, but with a longer time constant. The use of a longer time constant is related to the time stability of clutter signals rather than to that of targets.

In a particular embodiment, the clutter subtraction filter may take the following form, wherein the function updates the local clutter replica and subtracts it from the raw data to return only the moving objects in the field of view:

Clutter subtraction:

$$\text{RawData\_ClutterSub}(t) = \text{RawData}(t) - \text{ClutterReplica}(t)$$

Clutter update:

$$\text{Clutter\_Replica}(t+1) = \beta_{CU} * \text{Clutter\_Replica}(t) + (1 - \beta_{CU}) * \text{RawData}(t)$$

where $\beta_{CU}$ is the clutter update forgetting factor.

Main Signal Processing

The signal is then processed by a three-stage multi-branch digital filter 710, 720, 740 comprising a first stage basic moving-target indication, a second stage 720 comprising a first-order undulation filter 722 to provide higher-resolution coherent tracking, and a third stage 740 comprising a second order undulation filter 744 to deal with acceleration and to support imaging. A further optional fourth stage 760 allows for additional processing, including target classification.

These stages will now be described in more detail.

Filter Stage 1. Basic Moving Target Indication

Basic moving target indication is achieved by means of a target range detector 712, which resolves targets that are in range by using the radar real aperture. This provides for detection of the presence of targets in range and the determination of their range. Delay comparison using the real aperture allows angular measurement.

The motion of the platform, and the expected motion of targets defines the maximum and minimum rates of change of range ("range rates"). The signal is sampled according to a number M of such successive range values, spanning the expected range from a minimum range $R_{min}$ to a maximum range $R_{max}$ and assigned to corresponding range 'bins'. That is, the amplitude A and phase φ of the signal is received and down-converted at M pre-assigned delays during a period of time following each pulse transmission and prior to the next transmission, and transformed from the time domain to the range domain by simple consideration of the round-trip time-of-flight of the signal from transmitting antenna to target and the return to the receiving antenna.

Each new range scan S therefore comprises M sample values:

$$\underline{S} = \begin{pmatrix} (A, \varphi)_{R_{MAX}} \\ \ldots \\ \ldots \\ \ldots \\ (A, \varphi)_{R_{MIN}} \end{pmatrix}$$

The range scan 600 is repeated at the scan interval $t_s$. The value of $t_s$ may be equal to the PRI, or it may be a submultiple of the PRI.

In a preferred embodiment, the range gates are so configured so as to provide a contiguous, or near-contiguous, sequence of range bins such that the expected range from minimum range $R_{min}$ to a maximum range $R_{max}$ is sampled substantially in its entirety, without gaps. There may be some overlap between the range bins.

A range scan as so described is generated for each antenna array element, such that for L antenna array elements there will be a total of L such range scans.

This first stage provides for the simple detection of the presence of targets and a preliminary determination of their range and angles.

Filter Stage 2. First Order Undulation Filter—Higher Resolution Coherent Tracking For a single target at a particular range and an appropriate narrowband signal, the range rate may be determined directly from the Doppler shift. For narrowband signals, Doppler filtering may also be sufficient to resolve multiple targets. However for multiple wideband signals the Doppler spectra are liable to overlap, reducing resolution. Equally if motion is non-uniform, Doppler resolution is impaired.

To assist in resolving targets that are coincident in range but that differ in range rate, a first order undulation filter is implemented. (For a moving sensor with fixed targets this is related to aperture synthesis to a first approximation: for moving targets it is related to inverse synthetic aperture processing.)

Figure 6:
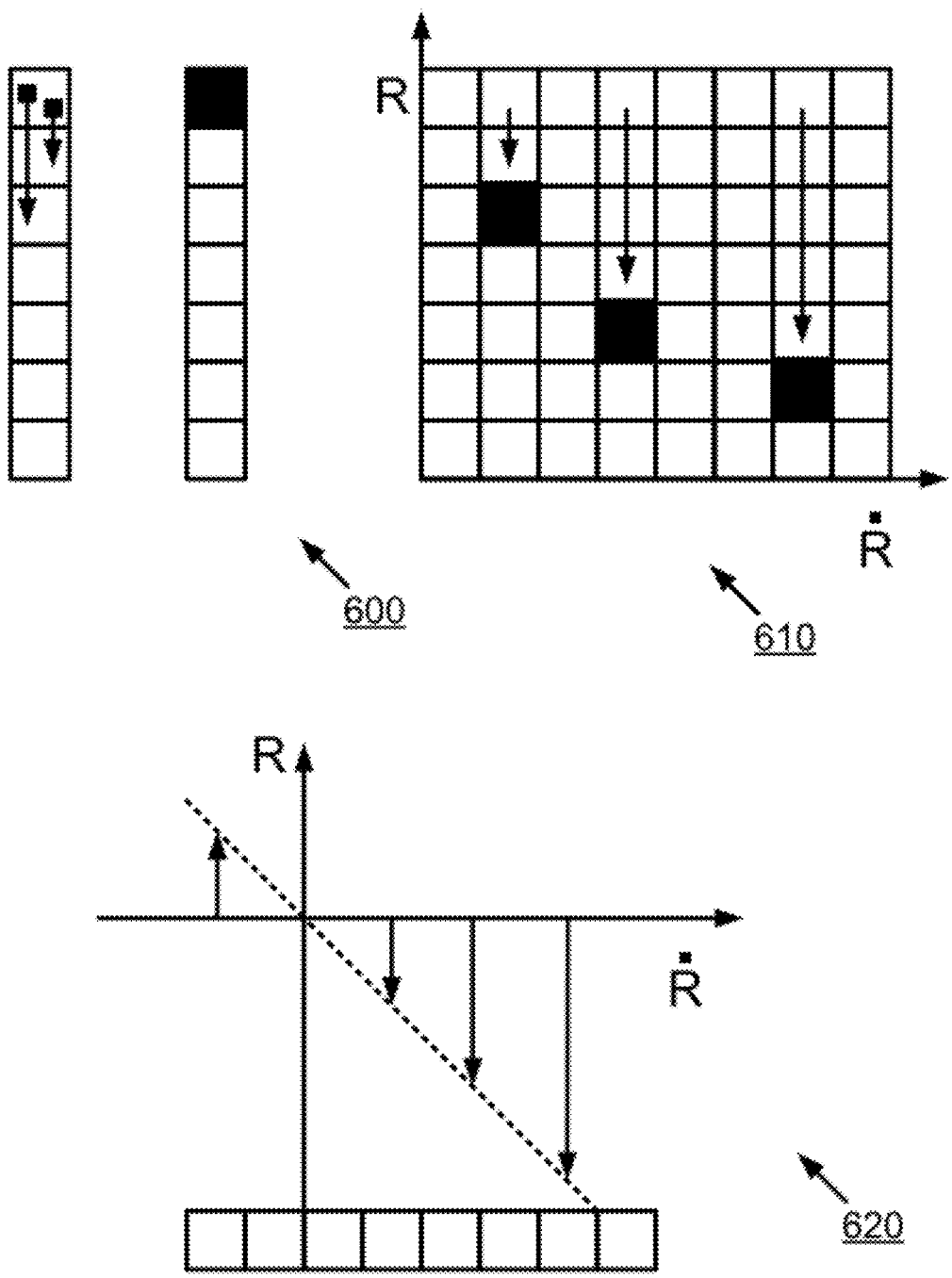
FIG. 6 is a representation illustrating operation of an undulation filter.
Figure 7:
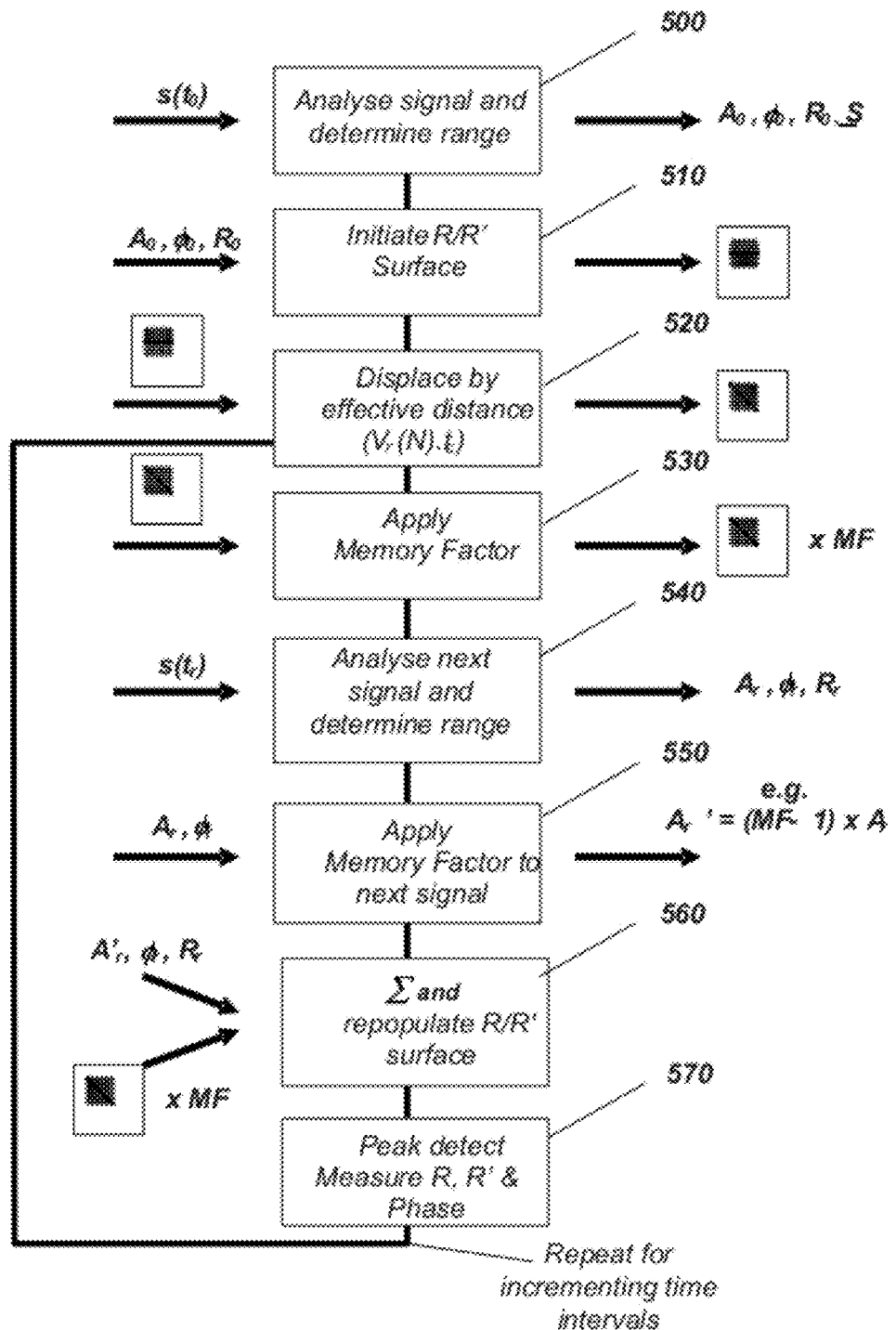
FIG. 7 is a simplified flow diagram of undulation filtering process carried out by apparatus embodying the invention.

With reference to FIGS. 5 to 7, the undulation filter method comprises selective reinforcement of a data array 610 of stored and projected target signals. In the case of an infinite-impulse-response (IIR) filter, the reinforcement is achieved by the weighted addition of new target data, wherein said data array comprises stored target signal histories time-evolved or delay-advanced according to a set of likely range rates, and subject to sequential attenuation by a 'memory factor'.

Successive additions of new range scan data allow for increasingly accurate determinations of target ranges and range rates, and facilitate target discrimination and tracking. Incoherent noise is suppressed. Targets moving at different rates reinforce different branches of the filter, thereby being resolved. Signal interference between such targets is avoided.

As seen in FIG. 6, the undulation filter is in essence a multi-branch time-domain digital filter. The nature of the filter may be chosen appropriately for each element of the range/range rate matrix.

As mentioned above, in this form each new range scan 600 comprises M sample values of amplitude A and phase φ from a minimum range $R_{min}$ to a maximum range $R_{max}$.

The minimum range $R_{min}$ may be zero.

In a similar way to considering the possible range values, a number N of possible range rates $V_r(N)$ of interest can be defined, which span values from $V_r(1)$, the minimum inward speed of interest to $V_r(N_{max})$, the maximum inward speed of interest. The N values may be linearly spaced or otherwise.

In an alternative, the data array can be extended to take account of objects receding from the source by having the leftmost columns represent negative range rates. $V_r(1)$ would then refer to the maximum outward speed of interest.

A two-dimensional data array D 610 can therefore be defined, comprising M rows (of range) and N columns or branches (of range rate), where each element (M,N) of the data array therefore contains a complex value of the signal amplitude and phase $(A, \phi)_{MN}$.

$$\underline{D} = \begin{pmatrix} (A,\varphi)_{R_{MAX}V_r(1)} & \cdots & \cdots & \cdots & \cdots & (A,\varphi)_{R_{MAX}V_r(N_{MAX})} \\ \cdots & \cdots & \cdots & \cdots & \cdots & \cdots \\ \cdots & \cdots & \cdots & \cdots & \cdots & \cdots \\ \cdots & \cdots & \cdots & \cdots & \cdots & \cdots \\ (A,\varphi)_{R_{MIN}V_r(1)} & \cdots & \cdots & \cdots & \cdots & (A,\varphi)_{R_{MIN}V_r(N_{MAX})} \end{pmatrix}$$

Each column, or branch, therefore corresponds to the predicted range scan signal which would result from targets moving at the particular range rate specific to that column i.e. the data array is effectively a store of multiple copies of range scan data, each evolved according to successive values of range rate.

The data array so described can be said to define a "migration surface", or a "range/range rate surface". In this particular arrangement of the matrix elements, increasingly distant objects are represented in successively higher rows; increasingly faster approaching objects are represented in columns successively to the right.

Figure 8:
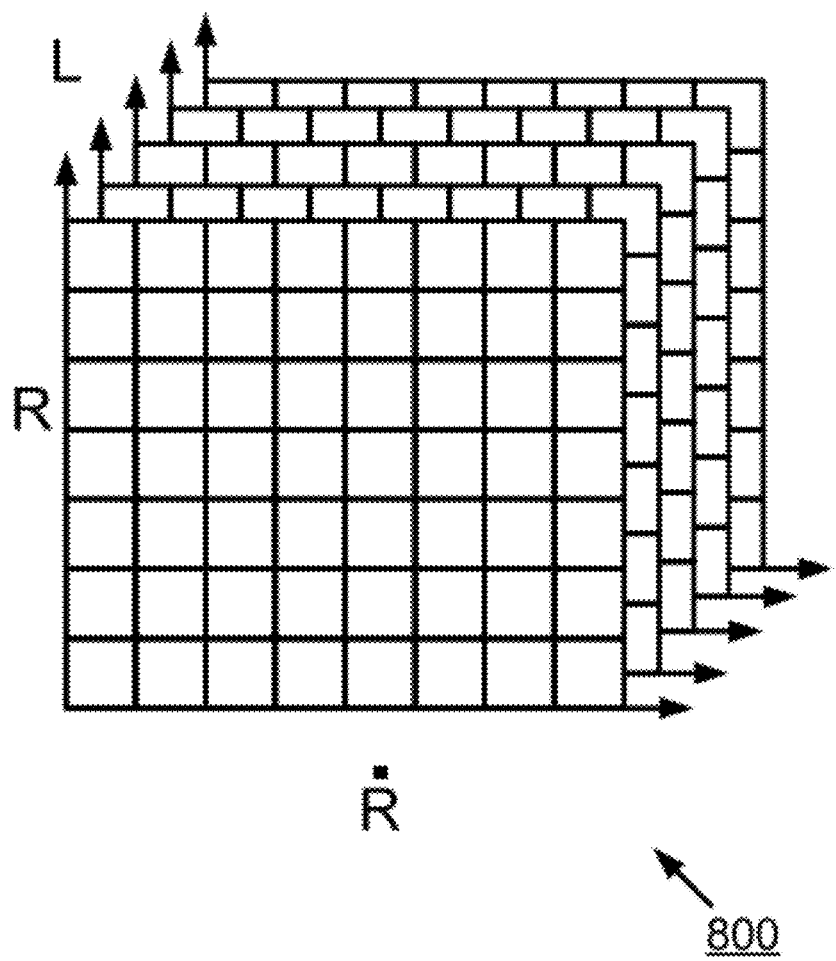
FIG. 8 is a representation illustrating operation of undulation filtering for a plurality of receiving elements.

As shown in FIG. 8, a data array 610 as so described is generated for each antenna array element, such that for L antenna array elements there will be a total of L such data arrays 800.

This data array is used to select signals corresponding to targets approaching at one of the predetermined range rates. The signals so selected are then combined with the data array to facilitate enhanced subsequent estimations of the target trajectories.

The operation of the undulation filter is described by reference to an IIR filter but may take other forms.

At each successive range scan interval, a new range scan is added into the data array. This involves summing a fraction of the new range scan data with a fraction of these stored, time-evolved or delay-advanced signals. Those signals in columns corresponding to the target speed are coherent in phase and are enhanced, while those which do not correspond with that particular range rate are out-of-phase and after series of such summations are rejected.

The process begins by seeding the data array with multiple copies of the first range scan, one for each of the N columns. Alternatively the data array may be seeded with zeros.

The undulation filter process is summarised in FIG. 7 and involves the following key operations:
1. Acquire a first range scan
2. Time-adapt the data array
3. Apply the memory factor to the data array
4. Add weighted fraction of new range scan data to data array
5. Repeat sequence from step 2.

1. Acquire a First Range Scan

As seen in FIG. 7 initially at time $t_0$ each incoming echo signal is $s(t_0)$ received and analysed at 500 to provide a corresponding range scan $S(t_0)$ as generally described above. The phase and amplitude of each detected return signal is measured. When compared with a threshold the range of the associated target calculated from the time of flight, and its direction from the differential delays.

The array D representing the range/range rate surface is initially populated at 510. For each received signal, the row of the surface which corresponds to the range calculated is populated with the associated measured phase, and amplitude.

2. Time-Adapt Data Array

Each successive range scan provides an opportunity to improve on the current estimate of target trajectory.

At 520, for each successive range scan interval $t_s$, the range scan signal represented by each column of the data array D is time-adapted, or 'delay-advanced' by an amount proportional to the corresponding range rate represented by that column. This is achieved by moving each value within the column to a different row based on the change in range a target would experience if moving at the corresponding range rate; by interpolation between the rows if the change in range is less than the separation of rows; by phase rotation if a complex form of the signal is being used, or by a combination of phase rotation and interpolation.

It will be appreciated that whilst the term "time-adaptation" is used to describe the movement of data within the data array, for the purposes of clarity, the process may also be referred to as "time evolution" of the data array.

The M range values are separated by a known distance, equivalent to a known phase offset at the designated centre frequency of the signal.

For example, consider a target approaching a sensor at 1 ms$^{-1}$ and said sensor scanning the field of view at 100 Hz. In each 10 ms scan period, the target moves 1 cm closer to the sensor. The sensor may operate for example at 5.8 GHz. In the branch of the filter corresponding to a predetermined approach speed of 1 ms$^{-1}$, all received signals (including those from other targets moving at different speeds, such as targets that do not move relative to the sensor) are subject to a delay advance equivalent to 1 cm (or 67 picoseconds). Thus, for example, the phase of the complex signal is adjusted by an amount equivalent to 1 cm; hence phase is treated coherently/consistently.

In one embodiment, for example, the centroid of each column is displaced by an effective distance $-V_r(N) \cdot t_s$ (against the direction of motion of the target) in the 'N' dimension. In another embodiment VAN) may vary non-linearly with N.

In the case where a band-limited signal is represented by complex amplitudes of a sine wave, the signal represented by each complex sample value is multiplied by a unit vector with phase offset phase $\phi$, where $$\underline{\varphi} = 4\pi \cdot t_s \cdot \frac{f_c}{c} \cdot V_r(N)$$

3. Apply Memory Factor to Data Array

Data within the data array can be said to represent a store of estimated target ranges.

At 530, the array of target ranges determined at 520 is attenuated by a memory factor, or 'forgetting factor', MF. The memory factor is used to determine both the persistence of previous estimates, and the effect of newly acquired data in contributing to the next prediction of target ranges.

For example, the memory factor MF can be a single scalar quantity defined by $$MF = \left(1 - \frac{1}{n}\right)$$

where the number n determines the characteristic number of new range scan acquisitions over which stored data signals persist. This number n can be set equal to a pre-determined number of range scans, such as n=10 or n=100. i.e. the method effectively employs fractional integration to give an effective integration over a time period represented by n scans.

The memory factors are typically scalars between 0 and 1. Typical memory factors are 0.9 or 0.99, corresponding to filters that 'learn' over about 10 or 100 scans, respectively.

A more advanced method uses an M by N array (or surface) of selectable 'memory factors', and each column of the delay advanced data array is multiplied at 530 by a factor MF(M,N) selected from the M by N array of 'memory factors'. Hence, different memory factors are used for different range rates. Similarly different memory factors may be used for each row and or each individual cell of the filter array.

The memory factors may all be the same or may, for example, increase as speed decreases, allowing higher effective integration times for slower speeds.

The memory factor may be thus be defined by a function parameterised by range and range rate (and/or other appropriate parameters). The memory factor applied may also, for example, be a function of time with a different memory factor be applied for each successive iteration.

In a yet more advanced version a more complex function or transformation (or array of functions/transformations) may be applied to the contents of the array (or each column/row/element as the case may be).

4. Add Weighted Fraction of New Range Scan Data to Data Array

At time $t_r$, the next incoming echo signals $s(t_r)$ are received and analysed at 540 to provide corresponding range scans $S(t_r)$. The phase and amplitude of each newly detected return signal is measured and the range of the associated target calculated.

For each newly return signal, the row of the array D which corresponds to the associated calculated range is modified.

At 550 the effect of each new signal on the corresponding row of the existing array D is determined according to the memory factor MF. For example, the new signal may be multiplied by (1−MF)=1/n before it is added to the corresponding array element (M,N) at 560.

The filtering process from steps 2 to 4 is then iterated for successive range scans $s(t_{(r=r+1)})$ to further enhance target signals.

The reinforcement effect of successive range scans thereby enhances signals corresponding to targets moving at a specific range rate, relative both to noise and to targets moving at other speeds. Thus, the filter may be said to evolve over time iteratively in dependence on successive signals received.

Other forms of the filter can be used provided that they preserve the phase of the received signal. For example, in a finite impulse response (FIR) filter, the data array contains a history of recent received signals, and the migration surface is formed by coherently summing signals chosen along different range/time gradients within the array.

That is, multiple successive signal scans may be stored, and the filter is applied by averaging over values corresponding to different range gradients in the two-dimensional signal memory.

In a particular embodiment, appropriate for example to automotive applications, the first-order filter may take the following form, wherein the system runs a bank of 16 first-order filters for each of the 32 range bins, with each filter attempting to add coherently at the specified range-rates.

Range-rates are simulated by rotating the last measurement by the phase lag equivalent to the range moved per scan, i.e.

ShiftRotMigArray(r,ṙ)=MigArray(r,ṙ)*Phasors(ṙ)

where

Phasors(ṙ)=$e^{j(2\pi/\lambda \cdot 2 \cdot \dot{r} \cdot t_{scan})}$, and $t_{scan}$ is the scan rate, say 1/1131 s.

Notes:
1. the Phasor arguments (i.e. lags) are stored from one update to the next, giving smooth rotating vectors corresponding to each specified Range-rate, and
2. Phasor arguments greater than 2π are handled by shifting the MigArray elements appropriately.
3. The maximum Range-rate is determined by:

$$\dot{r}_{max} = \frac{\lambda}{2 \cdot t_{scan}} = 29.25 \text{ m/s}.$$

Each of the 16×32 filters use the following first order update:

MigArray$_t$(r,ṙ)=$\beta_{MA}$*ShiftRotMigArray$_{t-1}$(r,ṙ)+(1−$\beta_{MA}$)*BasebandData$_t$(r)w here $\beta_{MA}$ is the migration forgetting factor.

In theory we should compensate the phase rotated MigArray values for the change in envelope by using fractional delay filters. However, for the following reasons this is not necessary:

The envelope change is not significant for the length of pulse used.

The fractional delay filters are approximate and computationally expensive.

Real targets do not generally move with exactly constant ṙ.

The migration image is computed by averaging the absolute value of each channel for each Range and Range-rate bins, i.e.

$$MigIm(i, j) = \frac{1}{N} \cdot \sum_{k=1}^{N} abs(MigArray(i, j, k))$$

with the abs function is approximated by:

abs(x)≈0.9481*(abs(I)+abs(Q))−0.5566*min(abs(I), abs(Q))

where x=(I+i·Q). This approximation is necessary to avoid the use of squaring and square-rooting which results in a loss in bit-accuracy when using 16-bit operations.

Target Resolution and Tracking

Concentrations of signal energy from the first-order undulation filter are found by a peak detector 724.

In previous short range radar systems, target detection has been achieved by finding peaks in the one-dimensional received signal amplitude as a function of delay time after the transmission instant (or range R). In the system of the present embodiment, the received signal is represented by a two-dimensional array in which amplitude varies not only as a function of range R, but also as a function of range rate R-dot. Detection then consists of finding peaks on a two-dimensional surface rather than in a simple time series.

The surface may be formed by various processes, including squaring and summing the in-phase and quadrature signal values for each channel at each value of R and R-dot, by finding the amplitude of each and summing, or by cross-correlating all channels and finding the correlation peak.

Peaks in the surface may be found by contour searching, in which values on a perimeter are compared with the maximum inside the perimeter. This is time consuming, but provides reliable detection of signals representing targets that are resolved both in range and range rate, and therefore are less prone to noise and fading. This is an improvement over prior art associated with the embodiment of the present invention.

A faster process is to find coincident peaks in the R-dimension and in the R-dot dimension, and then search for and reject those that reflect saddle-points in the surface. This is more efficient, and represents a further improvement.

The peak detector forms an image intensity array by squaring each data array element and summing the values at each (M,N) for all the L antenna data arrays.

Alternatively, the signal magnitude may be used.

Again, alternatively, the signal image may be formed by summing the complex signals with appropriate phase offsets before finding the magnitude. This has the advantage of forming a narrower detection beam in a chosen direction prior to detection, whilst also retaining elementary phase information.

Detection is performed at each point of the image array by comparing the resultant intensity or magnitude at each point with a threshold value and with all of its neighbouring points.

In a particular embodiment, the peak detector may take the following form, wherein:

Peaks are detected by firstly subtracting the Migration Image thresholds from the Migration Image, i.e.

MigIm0=max(0,MigImage−MigImThresh)

and then computing where the second derivative is negative in both Range (dr=1:16), peaks_r(:,dr)=[0;diff(diff(MigIm0(:,dr))>0))<0, MigIm0(32,dr)>0]

and Range-rate (r=1:32), peaks_dr(r,:)=[0,diff((diff(MigIm0(r,:))>0))<0, MigIm0(r,16)>0]

i.e.

peaks=peaks_r & peaks_dr.

The peak values are then extracted from the Migration Image at these peak locations:

MigImPeaks=MigIm(peaks).

This method for obtaining peaks can create 'false' peaks (i.e. not distinct) in the Migration Image (see top of the Detected Peaks plot) and thus the MigImPeaks are pruned by taking each peak in turn and looking at its neighbours for a larger peak value. If one exists, the peak is removed from the list of peaks.

Signals associated with each peak are passed to a peak estimator 726.

The peak estimator 726 calculates the energy and spread of a detected peak and determines both the range R and the range migration rate R-dot of each target above a threshold energy level.

In one particular embodiment, the peak estimator may take the following form:

The positions of the peaks are extracted from the Migration Image and new RawTargets records are created for each peak. The RawTargets fields are described below:
1. Tag—a unique target identifier.
2. Inst—flag to indicate an instantaneous bin target (i.e. no migration filtering).
3. PhaseData—compensated phase data.
4. Power—Migration image amplitude.
5. MigCoords—Migration Image coordinates.
6. Range—computed as RangeOffset+ PeakPos*MetersPerSample/2.
7. RangeRate—computed from MigLags(Peaks(j)) *ScanRate*MetersPerSample/2.
8. Assoc—association pointer.
9. ActivitySReg—shift register of past activities.

These RawTargets are sent from the VC01 to dSPACE for association and tracking. At present the system is limited to sending 32 RawTargets per scan.

This data is passed to the target resolver 728. This measures the relative phases φ at different receiving elements {antenna} and estimates the range R, azimuth θ and elevation ζ of targets.

In a particular embodiment, the target resolver may take the following form:

A phase differencing approach is used to determine the location of the target in 3D, i.e.

$$\sin\phi = \frac{\Delta\theta}{2\pi} \cdot \frac{\lambda}{B}$$

where φ is the Azimuth angle, Δθ is the phase difference, λ is the wavelength, and B is the baseline between the receiver pairs.

The sensitivity function for this method is:

$$d\phi = \frac{\lambda}{2\pi B} \cdot \frac{1}{\cos\phi} \cdot d(\Delta\theta)$$

which shows that:
the resolved angle is less sensitive to phase errors if B is large, and
as the angle increases towards ±90°, the sensitivity to phase errors→∞.

Thus it is desirable to use receiver pairs with larger baselines, but the robustness of the algorithm is dominated by the 1/cos φ term and degrades at the edges of operation.

Since the filter preserves phase information, the angular position of a resolved target can be established by comparing the delays or phases of the complex signals at the relevant point of the array for each antenna element.

That is, each of the L data arrays (one per receiver antenna) represents a particular detected object by data element (A, φ) in the data array at position (M, N), and the differences between the phases φ of these particular L data elements are directly related to the different path lengths between the object and each of the receivers.

In summary, by providing filter branches at all range rates of interest, all targets can be enhanced with respect both to noise and to other targets even when at the same range.

It will be appreciated that, since the filter is linear with respect to all signals, the filter preserves the wideband spectrum, phase and time signature of each signal. Furthermore, as phase is maintained, where two signals are resolved in range rate at two receivers, the target directions can be determined separately even though they are not resolved in range.

The use of a two-dimensional array means that once a target is resolved in either range or range rate, direction can be determined from the phase or delay between corresponding positions in different data arrays, rather than by further Doppler analysis, assuming a certain trajectory and speed.

This process does not depend on the signal having a narrow bandwidth. Its gain with respect to noise depends on the effective increase in time-on-target. Its selectivity for a target moving at the predetermined speed with respect to targets at other speeds depends on the orthogonality of the signals under the conditions of sampling and scanning in the particular case, however, selectivity of 20 dB is typical.

In the case where the motion of the radar platform is known and the targets are static, this filter may be considered as an unfocused synthetic aperture radar (SAR), with a range of digitally-formed beam directions.

In the case where the relative motions of the platform and the targets are unknown, this filter may be considered as a first-order inverse interferometric synthetic aperture (IISAR) radar, since it makes a first-order estimate of the relative trajectory of the target based on the phase history at each antenna element and the phase differences between the antenna elements.

As will also be appreciated, the filter can be designed so that its resolution with respect to speed or range rate is finer than the relative Doppler bandwidth, and may vary with speed. In a vehicle or other moving platform the filter allows the radar to separate reflections from objects that differ in direction relative to the sensor motion.

Other filter designs may also be used, in which time-domain and frequency-domain filter processes can be combined.

Evidently, once targets have been resolved in terms of range R, azimuth θ and elevation z, there exists the possibility of target tracking, wherein target trajectories are estimated by the tracking filter 730.

Detected targets may be stored in the form of a track containing amplitude and phase histories for each antenna element, and allow the estimation of a trajectory that best matches the observed history.

More advanced target tracking and means for target imaging and classification are provided for in the third filter stage which involves second order migration processing.

Given a trajectory estimate from the first-order filter, it is possible to predict whether R-dot should increase or decrease as the motion evolves, in order to seed the second-order (accelerative) filter.

It will be appreciated that the first-order filter process operates on the whole received signal and is a two-dimensional process which is computed for each element, it therefore requires considerable computing resources.

In order to minimise the computational burden for the second-order filter, prior target detection from the first-order filter is used to select signal histories that correspond to actual targets and ignore those signals that have not been detected or resolved. This is achieved by the data selector 742 which finds the raw data history relevant to a track. These selected histories can then be subjected to the second-order process with the benefit of having several known quantities with which to precondition the process, including: range, range rate, angular position and estimated angular rate. These can also be used to apply accelerative terms associated with the angular rate, and to separate special cases of trajectory for specific further processing.

Only a relatively small number of accelerations/acceleration bins need to be processed. For example, one, two, three, five or more bins may be required.

The advantage in limiting the data input to the second order filter 744 to those regions corresponding to the detected targets of interest can be appreciated by realising that for each detected target, the second order filter can be envisaged as tracking over a six-dimensional matrix comprising axes of say, range, range-rate, number of receiver elements L, and three components of acceleration.

Filter Stage 3. Second-Order Undulation Filter

The second-order filter provides multiple versions of the first-order filter.

That is, the second-order filter 744 provides a data array of complex amplitude versus range, range rate and acceleration.

As for the first-order filter 722, detected targets may be stored in the form of a track containing amplitude and phase histories for each antenna element, and allow the estimation of a trajectory that best matches the observed history.

The second-order filter may be achieved by, for example, providing range rate filter branches that are differently curved (range rate varies with time or range). Alternatively, 'leakage' between branches of the first-order filter may be allowed to occur. Whereas in the first order filter coherent integration was provided for signals using assumed constant rates of delay evolution or phase advance, in the second order filter the rates themselves are allowed to change linearly with time, to an extent that varies across a third dimension of the filter. One branch will have a zero rate of change, as for the second order filter, but other branches will accommodate change in range rates.

Target Acceleration

In this embodiment, target speeds are allowed to change explicitly (rather than as a result of changed subtended angles) from one iteration to the next.

The data array is seeded from the output of the first-order filter, having passed through the data selector 742. In the second-order filter 744, once again either separate branches are provided for each different acceleration superposed on each range rate, or signal energy may be allowed to 'leak' from one range rate branch to another the next higher or lower depending on the appropriate acceleration rate.

Essentially, the process applies time-varying phase adjustments for a range of trajectories close to the estimate—that is, within a given multiple of the variance of a trajectory variable as calculated within an estimator such as a Kalman filter.

Imaging

The set of trajectory estimates may be further refined by constructing images of the target according to a plurality of different estimated trajectories, selecting particular estimated trajectories according to the quality of said images (as determined by say, focus metrics), and subsequently feeding back.

An image intensity array may also be formed for the second-order migration results and detection may be carried out using intensity or magnitude.

The image array can be considered to comprise a two- or three-dimensional array corresponding to the area or volume of interest, populated by image points resulting from the coherently integrated amplitude and phase raw signal data.

Once a trajectory has been estimated, phase corrections may be applied that compensate for the estimated motion of each target.

Following phase correction, the relevant signals may be coherently integrated by the image integrator 746 to form a spatial image of the principal features, essentially by second order aperture synthesis. It will also be appreciated that the process is related to inverse synthetic aperture radar.

During motion, even if the speed of a target is constant, its range rate may change due to the variation of subtended angles. The second-order undulation filter permits continued coherent integration when such changes occur.

Considering that the trajectory estimate may contain errors, this procedure may be repeated for a number of trial trajectories close to the estimate, and focus quality or contrast may be calculated in each case. Suitable calculations may include image entropy or entropy of image contrast or contrast metrics.

The focus quality for each candidate image is assessed by the image analyser 748, and the best quality image, in terms of, say, sharpness of focus, selected.

Furthermore, by collating the history of each target and image, separate targets may be associated in a cluster—by the image resolver 750 matching target image points and measuring their elevation—and said cluster may be allocated to one of a set of target classes based on its dimensions, image form or motion.

The image integrator is, for example, a volume of memory assigned in Cartesian coordinates, in which signal energy integrated within the second order undulation filter is assigned to a Cartesian pixel by the image resolver.

By comparing the measures of quality so obtained, a decision may be reached as to the most accurate trajectory estimate, and the best form of image may be chosen and reported by the image reporter 752, which communicates the quality, parameters and content of the best image.

In summary, the imaging process comprises the steps of:
identifying regions of the migration surface of interest
refining estimates of target positions and velocities by applying accelerative terms
feeding the refined estimates of trajectories into the imaging process
imaging the target by means of coherent integration along each of the refined estimated trajectories
evaluating the quality of the resulting images according to image quality metrics and selecting those images which satisfy predetermined criteria
selecting those refined estimated trajectories associated with the selected images
feeding these selected refined estimated trajectories back into the second-order filter for subsequent iterations It will be appreciated that the number of imaging iterations is variable, and that successive iterations will yield additional detail of the target. Furthermore, prior knowledge of details of the target, such as size or shape, may be used to improve the imaging process and the evaluation of images.

Thus by sequentially exploiting successive features of the radar, increased precision and fidelity in detection, positioning, tracking and imaging may be achieved.

Further processing in the form of additional stages of phase adjustment may be applied, such as using a different range of trajectories or third- (or even higher) order adjustments. For example filters for higher order attributes such as 'jerk' ($3^{rd}$) or even 'yank' ($4^{th}$) may be constructed and applied using similar methods Special cases of trajectory are then separated for specific further processing.

Further Processing

This involves applying rules-based processing to the target tracks and track histories in order to classify targets according to their likely character and allows for behaviour prediction and threat assessment.

In particular, there is provided the ability to track target position, velocities and accelerations, and when combined with the stored track history data, provides for highly nuanced target evaluation and classification.

It will be appreciated that this process involves the use of the range/range-rate or migration surface to analyse said target histories, and that this finds particular application in target classification, perimeter definition and in linking 3D radar to vision.

Parametric Filter Definition and Adaptation

As discussed above the use of a memory factor allows the filter to be parametrically adapted (or evolved) over time whilst iteratively reducing the effect of historical contributions to the filter in dependence, for example, on the range rate applicable to array element being evolved.

Beyond the memory factor, a parametric definition may describe a multi-tap filter, each tap being described by a transformation and leading to higher-order filters or band pass filters. In an adaptive implementation the parameters for each cell of the data array might depend on the characteristics of a target found in that cell (i.e. may depend on its position or history), or may be reset if there is no detection within that cell (or possibly nearby cells).

One embodiment concerns the further processing of the clutter data which was determined in the preliminary signal clean-up stage described above.

Clutter, which typically appears as a zero or near-zero range-rate signal, would commonly be discarded as a signal of no interest. This is important to avoid a crowded or cluttered display. However, additional useful information can potentially be extracted from the clutter signal, such as, for example, identifying "objects", such as stationary vehicles, walls and furniture (in a building mapping application), trees or buildings in a land application or jetties or bridges in a marine application, as opposed to "subjects", such as people, moving vehicles, aircraft or vessels. The evaluation decision involves considering all aspects of the track and the track history.

The method may be further considered as discrimination between subjects and objects using the history, for example of the range rates of the unclassified target, and the proximity of the unclassified target to known clutter.

For example, an object is likely always to have a zero range-rate component, except in the special case of interference with a reflected signal from a moving object or subject. By contrast, in a building investigation, a subject standing extremely still is likely to yield a zero range-rate component for a significant but not dominant proportion of the time, say thirty percent or more. A subject walking radially to the sensor may generate no zero range-rate components over a history of one second. Likewise, a human subject is unlikely to exceed a maximum range-rate which corresponds to say sprinting.

Figure 9:
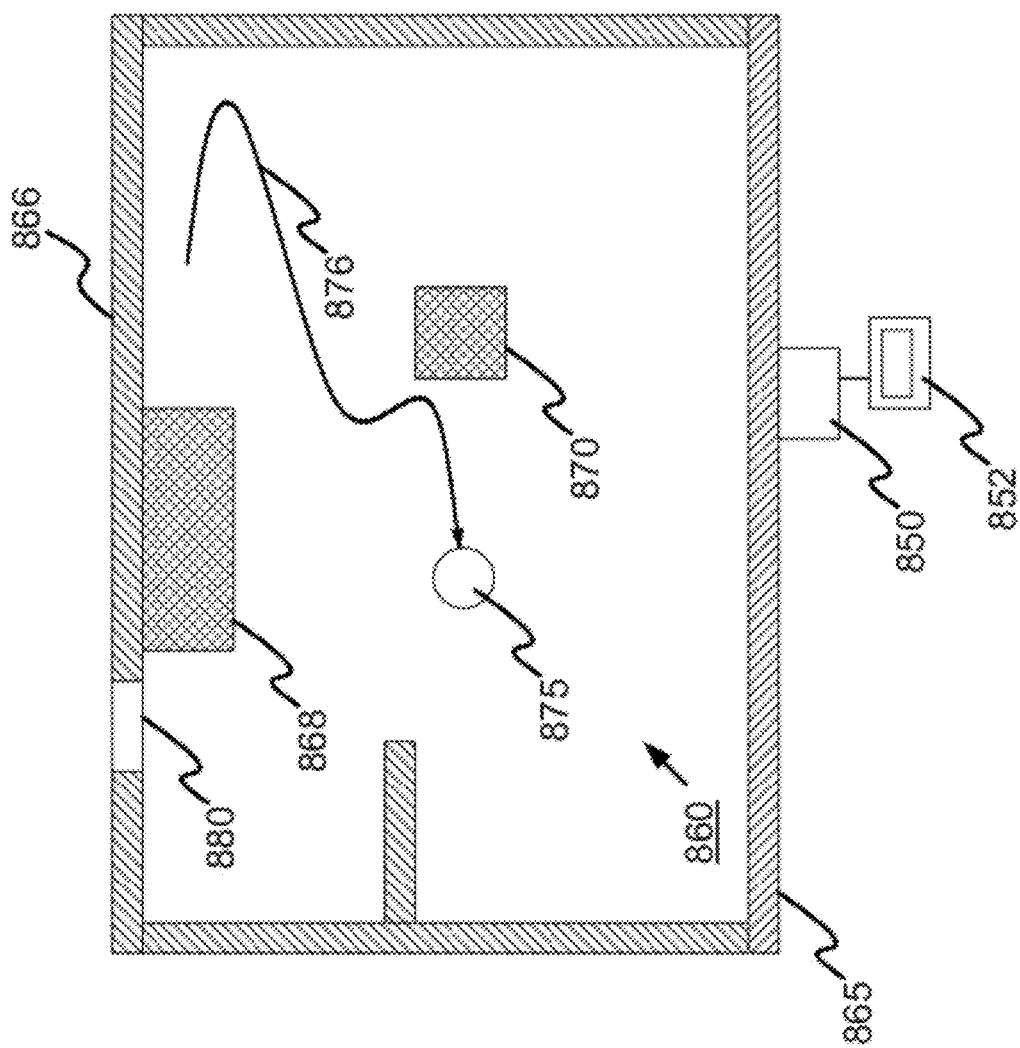
FIG. 9 is a representation of a typical operating scenario for a target classification system.

A typical operating scenario for a target classification system is shown in FIG. 9. Radar system 850 (which may comprise circuit elements as described previously in FIG. 4) is placed against a first wall 865 so as to monitor activity in a room 860 which is bounded by further walls 866. The output from the radar system 850 is displayed to the user on associated display 852. The room 860 contains stationary "objects" 868, 870 and a moving "subject" 875 (possibly a person). Also shown is the target history 876 for the subject 875.

It can be seen that from the vantage point of the sensor 850 for some of its motion the subject 875 has been obscured by the object 870. During this time the signal from the subject 875 will be lost to the radar system 850.

Use of a target history 876 allows the radar system 850 to track subjects persistently by maintaining awareness of the subject 875 and to predict its expected re-emergence from behind object 870. This allows for the subject signal and the target track to be easily recovered once the line of sight to the subject 875 is re-established. Essentially, the 'new' subject signal due to the subject 875 re-emerging from behind object 870 is re-associated with the earlier subject signal due to the same subject 875 from the time before it was obscured by the object 870 to form a continuous target history 876. This has the advantage of aiding with classification (the longer the target history the greater the confidence in the classification), and reducing errors due to target misidentification and/or misclassification.

Accurate discrimination between subjects 875 and objects 868, 870 allows for a more accurate clean-up of the display 852, with less chance of losing potentially important information.

In one alternative, the display screen 852 can be gradually blanked out unless a subject or object is observed, allowing the user to build up a picture of the observable and non-observable regions of the area of interest (the room 860). Regions can be non-observable due to further attenuation from obstructions (for example the region behind object 870) and this embodiment presents that information to the user. The use of the range/range-rate or migration surface to analyse target histories 876 in this way is a much more flexible method than would be possible using Doppler techniques. In particular, if the false alarm rate of objects classified as subjects 875 can be reduced to zero, then objects, once classified, can be allowed to persist on the display, allowing mapping of the static objects in an area, principally by using any moving subjects to generate the required information, though a rotating or otherwise moving sensor could achieve the same result.

Improved discrimination of targets can be achieved by combining various aspects of target information. This information includes:
  target information from the radar
    Target tag or target identifier
    Signal amplitude
    Target position (X, Y, Z, R)
    Target motion (Vx, Vy, Vz, Rdot)
    Phase mismatch
    Amplitude at each antenna channel
  Other information within the sensor includes: a history for each of the above for each target tag number; information on related targets, including those which are associated, interfering, shadowing or reflected.
    target characteristics
    These are unknown to the sensor, and include details of the subject behaviour, such as whether the subject is approaching or receding, sitting, or standing.
    clutter characteristics
    These are unknown to the sensor, and include whether the clutter is due to a reflecting or non-reflecting object, or whether the clutter is intrinsic to the radar system.

The object is to distinguish all these classes, to provide a more informative display.

A key distinction is between Subjects and Objects, to allow Objects to be excluded or visually marked, and their interactions with Subjects accounted for. It will be appreciated that it is important that in distinguishing between objects and subjects one is not mistaken for the other. This needs to be considered initially at the time of classification and also later in presenting this information unambiguously to the user.

Regarding the classification method, it is important that this has a low likelihood of classification error, i.e. a low probability of erroneously identifying a subject as an object—or vice versa. In this regard it is useful to provide some method of re-classification in order to take account of such errors and to correct for them as more data becomes available. It will further be appreciated that consideration of the track histories for detected subjects may be used to make such distinctions.

In one embodiment, an object is re-classified as a subject if a predetermined amount of movement is detected. In a more advanced embodiment, the re-classification only occurs if such a movement has been detected for a predetermined amount of time.

It will be apparent from the preceding discussion that Subjects and Objects may be further classified, for example into substantially still subjects (e.g. standing still) or moving subjects (e.g. walking), or permanent objects (e.g. walls) or new objects (e.g. vehicles, or other objects that have evidently moved during the observation period).

Referring again to FIG. 9, walls 866 or other stationary objects 870, 880 (such as furniture e.g. filing cabinets) may be identified by the radar system 850 (via for example a control and processing stage 66 as shown in FIG. 4) by, for example, a persistent high intensity signal reflection at a fixed position and/or 'shadowing' of subjects moving behind the wall or object. The intensity (or other characteristic) of the reflection may be used to provide further information regarding the nature of the wall such as its thickness or constituent material. The expected position of objects may also be used by radar system 850 to aid classification. For example, when monitoring a room 860 through a wall 865, information regarding the position of walls 865 within the room may be already known to the radar system 850 or else derived from the geometry of the room 860 and position of other (possibly exterior) walls 866. For instance, it is likely that further walls 866 are either parallel or perpendicular to other walls, potentially aligned with the sensor 850 (where the sensor is applied perpendicularly to a wall 865), and tend to have appreciable lateral extent. A class of object, "wall", may therefore be defined on this basis and objects allocated to this class accordingly.

Likewise, persons 875 can be identified and allocated to an appropriate class. A person may be seen as a quasi-static subject, with periods of stationary behaviour interspersed with periods of motion. Even a stationary person will nevertheless exhibit various small-scale motions. Limb movement may be detected by doppler-style techniques; breathing (a characteristic movement of approximately one hertz frequency) may be detected by micro-doppler techniques. Both types of motion may be used, either independently or in combination, to classify a target.

The target trajectories 876 may be described or modelled by well-behaved mathematical functions such as polynomials. Potentially, a series of increasingly higher order polynomials or other functions may be used. These are less useful for directly describing target motions which are oscillatory, such as with the breathing subjects described above. One solution is to consider the behaviour of each point on the migration surface subject to each of a set of oscillation functions of different rates. Potentially, a series of increasingly higher order oscillating functions may be used. This allows for different rates of breathing to be identified and subsequently classified as say normal/shallow/panting etc.

The principle can be further extended: each additional analytical process (which may relate to a particular target behaviour or other attribute) introduced into the target classification scheme can form the basis of a new target class and hence additional information that may be presented to the user. Classes may themselves comprise further sub-classes to allow for suitably granular target classification according to requirements.

The classification process can be considered to be an iterative one, with the results of the application of a first set of target classification rules being used to determine which subsequent target classification rules to apply, according to the likely evolution of the target history. The classification rules may therefore be considered to be self-selecting and/or derived in accordance with principles used in the field of machine learning.

A more advanced embodiment implements a motion history 876 for each identified subject 875. This allows, for example, the use of predictive tracking to discriminate, for example, determined movement from mere loitering, and/or to distinguish between random motion and 'erratic but purposeful' motion (as might be observed of a vehicle traversing a bumpy road, or of a vessel affected by waves at sea)—and also to identify apparent changes of intent, which may be indicative of the subject responding to some event.

A yet more advanced embodiment considers motion histories at the different length scales described above, and can therefore provide a more subtle classification e.g. identifying agitation or potentially changes of mood.

Regarding the use in the present invention of target histories, it will be appreciated that in conventional target tracking the target is represented by a data array whose elements are typically updated as new data comes in, according to some estimating process that may involve a filter, such as a Kalman filter. By contrast, in embodiments of the present invention a long sequence of the signal history is carried with each target dataset. These signal histories include the amplitudes and phases for all antenna array elements from first detection to when the target is dropped. While this requires storage and processing of large data arrays, it offers much more opportunity for determining an optimum estimate of the target trajectory and for extracting attributes of the target and its motion.

Each identified target therefore has associated with it its complete (or at least the most recent) signal history, (possibly stored in raw data form), including amplitude and phase information from every sensor, and also the most recently determined target characteristics and a corresponding set of estimates/expected/predicted values e.g. 'next move' values of position, velocity, acceleration.

It will be appreciated that the significance of each measurement in the target history varies with time e.g. older measurements may become increasingly less relevant over time for determining the future trajectory of a target. Furthermore, once it is decided that a particular target is an object (i.e. stationary), certain measurements (e.g. those suggesting the object is moving) may appear to be aberrations. However, if said object is subsequently confirmed in later measurements to be moving these previous measurements become highly relevant, as they can be used, for example, to confirm re-classification of the target as a subject.

In a further embodiment, the target history further comprises the target attributes including any combination of the following: 3D positional information, range, azimuth, elevation, range rate, radial and/or tangential acceleration and/or higher order time differentials of any of the preceding.

In a yet further embodiment, a full record of alternate classification histories is also kept. This may comprise entries in each target history whenever a re-classification occurs or alternatively a set of complete signal histories according to each classification of said target.

It is therefore important to store a full data set comprising all the signal characteristics (including amplitudes and phases as received at each sensor) and/or attributes for each identified target. Whereas best trend estimates of target attributes can be derived relatively simply (say by defining a time constant, which may be used to truncate the data sample used for the estimation), more advanced processing, such as determining the rate of change of acceleration (or for deriving an image, as described above) requires all the corresponding amplitude and phase information for the target. This is then subject to processing via a suitable filter.

Storage of a full data set for each target also allows for further processing to be undertaken at a later time. This may be done to time-shift intensive processing to a more amenable time, or to reanalyse the data on another comparable or superior system. It also allows for a target not initially identified as particularly interesting to be re-examined in more detail, or for the later determination of additional information.

Figure 10:
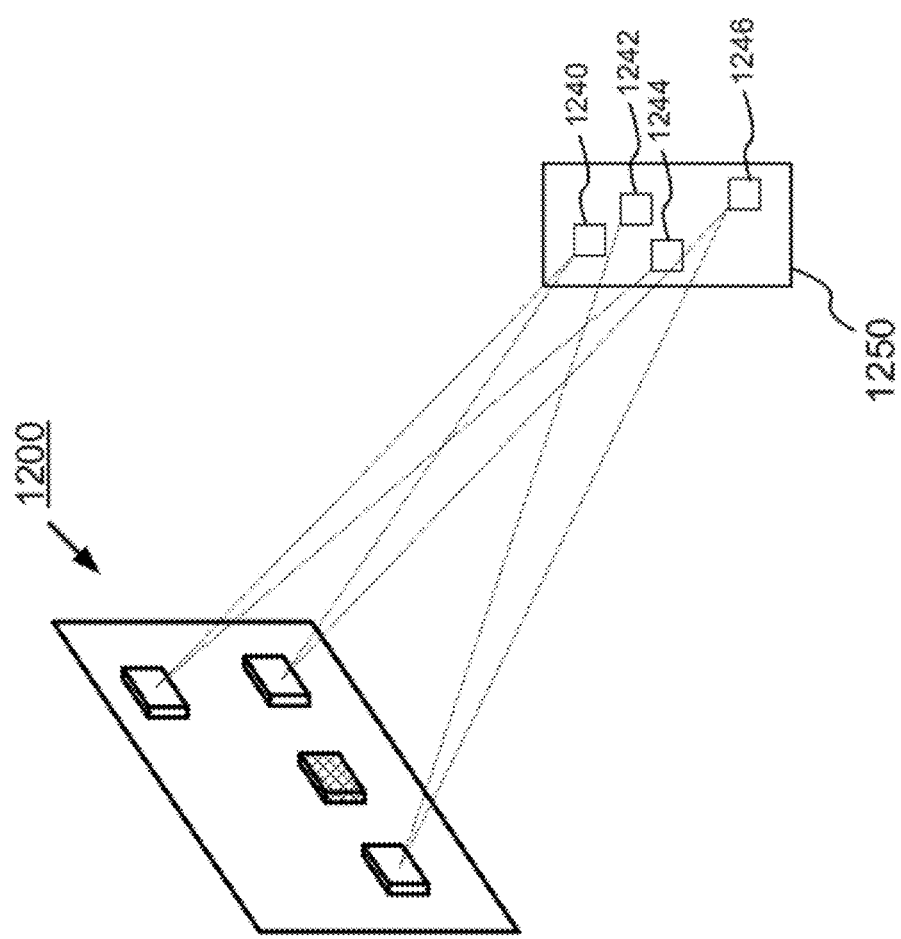
FIG. 10 is a representation of an embodiment of a target classification system.

FIG. 10 shows another embodiment of the invention. Radar system 1200 may comprise circuit elements as described previously in FIG. 4. In this embodiment, targets 1240, 1242, 1244, 1246 are grouped together by radar system 1200 (by for example the control and processing stage 66 as shown in FIG. 4) into a 'cluster' 1250. This may be used for cases where, for example, a number of targets 1240, 1242, 1244, 1246 are determined to exist in a particular volume in real space. Potentially the size of this is predefined as characteristic of some subject or object, say the size of a person. Furthermore where the individual target characteristics—instantaneous and/or according to their target histories—suggest some interdependence between said targets (for example, they remain close together over time, moving at similar velocities with similar accelerations). Naturally, some targets which exhibit ostensibly diverse behaviour may nevertheless be included in a particular cluster e.g. the alternate advancing and receding pattern of the swinging arms of a person walking, although resulting in noticeable doppler shifting in the reflected radar signal, may nevertheless be associated with that person. The migration filter may require a large number of range rate bins for this particular feature to be implemented successfully.

Typically, a cluster 1250 will comprise approximately ten targets (effectively ten responses from a single target of interest), although the classification algorithm may be set to consider clusters of as few as three or as many as fifteen targets or more, the values depending on the sensitivity of the sensor. Where a cluster 1250 appears to comprise a large number of targets, say 100, it is likely that this is a compound or composite object/subject which is better classed as two separate clusters. This would be characteristic, for example, of a person (subject) sitting on a chair (object), an arrangement which would be expected to result in more identifiable targets than a sole person standing.

As regards the user, referring again to FIG. 9, the display 852 can be so configured as to enhance clarity and thereby to reduce the potential for the user misunderstanding the information being displayed. This can be achieved by, for example, giving prominence to those items of most interest to the particular user. For example, subjects 875 (potentially persons) may be considered to be of more immediate interest to the user than objects 870, and moving subjects 875 especially so. The display representation of subjects may thus be made especially prominent (for example, by using brighter and/or larger and/or differently coloured or otherwise distinctive icons) compared to the representation of objects.

One embodiment presents objects by a 'fog' or fixed angular representations; subjects as spherical representations. Alternatively, subjects my be represented by a 'blob' representation comprising an amorphous surface representing signal returns from the particular subject.

This can be extended to highlight particular types or classes of subject (or object)—potentially having as many distinct representations of subject (or object) as there are classification classes of each.

A user may use different settings for successive sweeps of the area of interest, say a room, in order to identify different objects/subjects each time. For example, one sweep may identify the location of furniture within the room; another may identify the location (and state) of moving persons within the room.

An alarm (visual, audible or otherwise perceptible) may be provided for subjects of immediate and/or high interest or, say, for those previously identified as objects and reclassified.

In a further refinement, the representation of a particular object or subject on the display 852 may be made to vary with time. This may be done to indicate the certainty with which the subject or object has been identified (for example, from the characteristics of the signal response, or from the object or subject track history 876), and/or to indicate detected changes in the object or subject behaviour (whether from its actual track history or from a projected track). An object, such as a wall 866, may thus be represented initially on the display by a faint line which increases in thickness (preferably to a maximum value) as repeated classifications of the response as an object increase the certainty that the object is indeed a wall. Likewise, the certainty with which a previously identified subject continues to be so identified may decrease if repeated detections indicate that it has remained stationary for a predetermined time (or exhibits other non-subject characteristics), and this decrease in certainty may be shown by a concomitant decrease in the prominence of its representation on the display—and in time a switch in its representation from that of subject to object.

Alternatively, a previously identified object may begin to exhibit characteristics more akin to those of a subject. For example, a section 880 of wall 866 may subsequently be determined to be a door, which may be opened, or a wall 866 may be shaken—in both cases a previously static object will be exhibiting some degree of movement which may be therefore be considered worthy of further attention, and therefore their representations (or the part thereof) may switch from Object to Subject.

One embodiment of the classification process will now be described. In this example we deal only with the simple classification case (Subjects: Objects). However it will be understood that by extension of such rules many different classification schemes may be derived.

In the following, data sources within the radar are designated as follows:

(R) Raw data i.e. targets, clutter and noise
(C) Clutter i.e. the long-term average signal, excluding non-learned targets
(I) Instantaneous signal i.e. the raw data minus the Clutter, or I=R−C
(M) Migration filtered versions of (I)
 (MI)=Migration image surface
 (MIO)=Zero-speed migration image branch These data sources may also be described in terms of their associated envelope representations (RE=raw data envelope), (CE=clutter envelope), and (IE=instantaneous signal envelope).

Targets are detected from CE, IE, and MI, using adaptive thresholds.

One embodiment of an adaptive threshold is a piecewise linear threshold with 8 segments across 5m range, the end points of which are recalculated (shifted up or down) after every scan. The rules for moving end points up or down are based on the measured IE and ME signal levels in the range swaths to either side of the end point, and can additionally based on the number of classified or unclassified targets or tracks in that range swath.

For example, if a trackable subject is known to be in the area, then the threshold may stay low, allowing a significant number of tracks, while if a collection of tracks are non resolvable and suspected to be noise then the threshold may move up, excluding these tracks from subsequent scans, to save processing time lost by processing invalid tracks. This adaptive thresholding increases the resilience of the system to variations in attenuation of any obstructions and additionally saves processing time by concentrating tracking on the interesting areas of the field of view. In this way it maximises the useful dynamic range of the system for different attenuation and signal to noise environments.

The use of an adaptive threshold may therefore be understood to improve clutter rejection as well as noise resilience. Whenever many tracks at a particular range fail to be resolved as subjects (instead being regarded as noise or clutter) the detection threshold at that range is raised. This reduces the likelihood of new tracks commencing at that range, thus reducing both clutter acquisitions and noise acquisitions.

In one embodiment, the first one, two or three stationary targets are presumed to be objects; further objects are revealed by their interactions with subjects as the latter move around the area of observation.

Target Classification Rules and Procedures

Figure 11:
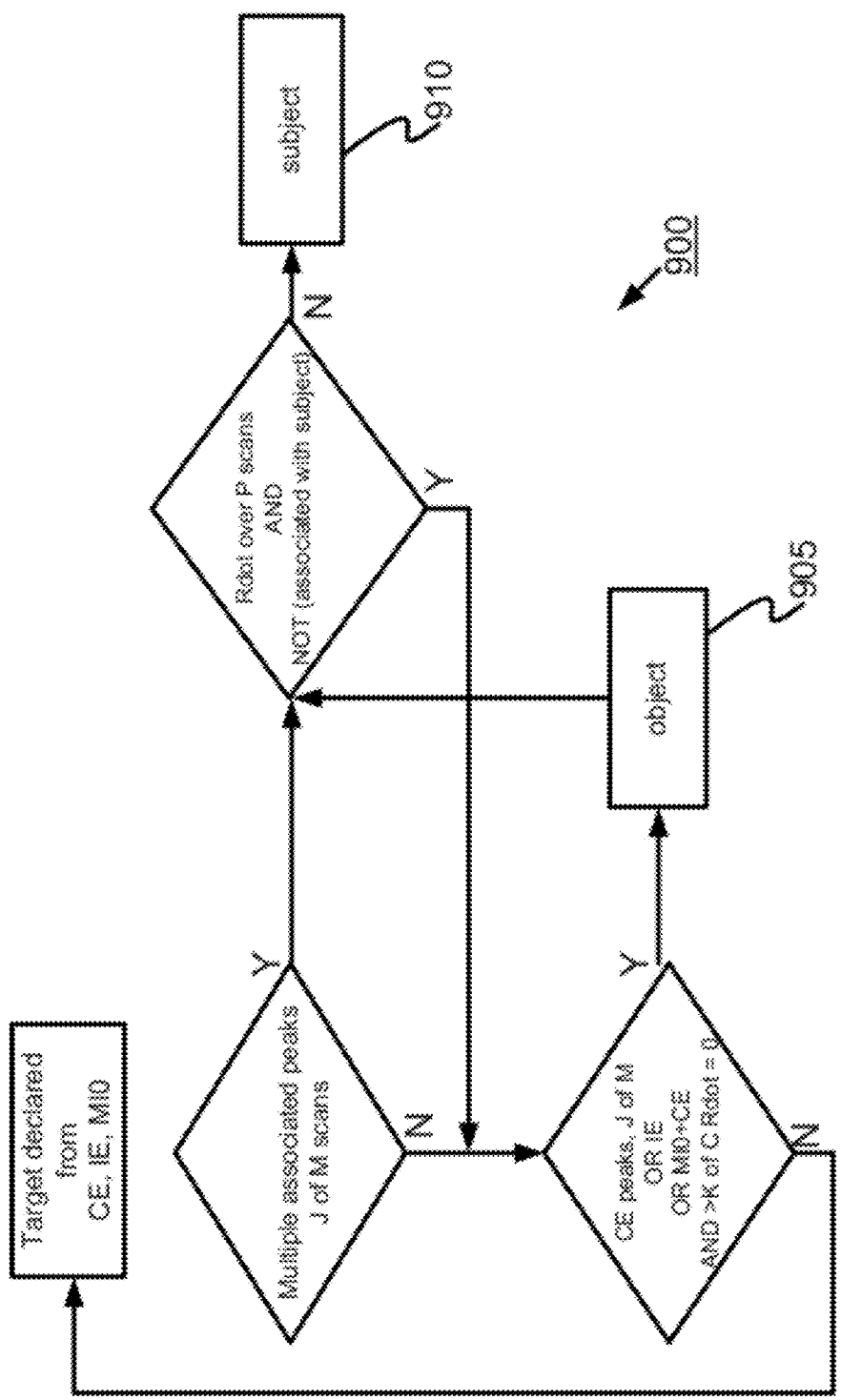
FIG. 11 is a representation of a further embodiment of a target classification system.

The classification proceeds according to the following display and classification rules 900, as shown in FIG. 11.

Where parameters are specified, it will be appreciated that the values of these parameters can be changed thereby altering the associated rule. Also, the setting of parameters to a particular value involves a degree of tuning, requiring a trade-off between say speed of detection and accuracy. Typically, parameters are hardware dependent and are preselected or alternatively preset by the manufacturer, although they may be configured for particular circumstances and situations if necessary.

It will be appreciated that many of these rules can be implemented in a relatively straightforward manner by means of consideration of the migration surface described previously.

1. Targets are not displayed until classified as either Object 905 or Subject 910;
   This is done to prevent user uncertainty about the classification of a target.
2. A Target is declared a Subject if:
   Multiple (X, Y, R, Rdot-associated) peaks (say at least J scans with >1 associated peak) are detected within M scans 920, with
   No (X, Y, R, Rdot-associated) Rdot=0 target over P scans 922.
   Parameters are set to determine the number of scans required in order to declare a moving target a subject. Here, M determines the number of scans required; J is representative of the confidence that a target is correctly classified as a subject; and P is representative of the confidence level that a target with zero range rate can be considered an object. Typical values of these parameters are M=100; J=25; and P=40.
3. A target is used to update a Subject if:
   The new target is (X,Y, R, Rdot-associated) with a Subject.
   Only data associated with targets coincident with a particular subject is used to update the data for that subject.

4. A Target is declared an Object if
   Detected (K out of N) from CE
   This determines how many objects K are to be classified in the initial scan N. OR
   Detected from IE or MIO AND associated with a CE Object
   Data already associated with an object is added to the data for that object OR
   Always L out of C ME component with Rdot=0, within C scans over history
   This sets the percentage of time a target must remain stationary in order to be classified as an object. Typical values are L=10, C=50, which corresponds to an object being stationary for at least 20% of scans.
   But—NOT associated tightly with a known system clutter feature
   System clutter is tracked separately in order not to be mistaken for objects.
5. An Object becomes a Subject if:
   No (X, Y, R, Rdot-associated) Rdot=0 target over P scans.
   This determines the number of scans, P in which if an object is detected as having moved, it is probably better described as a previously stationary subject having moved. P is typically 25 scans.
6. The number of Subjects should only be allowed to decrease after a longer than normal (N out of M) period with no associations unless the Subject is tracked into the boundary and lost.
   This allows for the persistence of subjects. Subjects may move behind objects and reappear; this allows for them to be tracked in the interim.
7. The number of Objects should only decrease if as (6) or if one becomes a Subject
   In practice, objects are only allowed to persist in this way when the confidence in their having been correctly identified is absolute. Where the confidence is less than certain, it is preferable such a step is not applied and an object not repeatedly reinforced with new associated target data be allowed to fade.

As an alternative to the heuristic rules-based classification scheme described above, target classification may also be performed in an adaptive manner, for example by neural network or hidden Markov model approaches against libraries or databases of known likely classes of target. The use of a database of known target characteristics has the advantage of a reduced learning curve for the classification process. Alternatively a pure Bayesian approach may be used. Although it will be appreciated that while the latter will provide the best results in those cases most similar to the (necessarily large) training set, the results will be poorer for entirely new scenarios than those from rules-based approach.

Modifications and Alternatives

As described above, the present invention is particularly well-suited for automotive applications. An extension of the apparatus to operate at longer ranges would find additional application in, for example, military and security uses and in a marine environment.

Use in a Security/Military Environment

The present invention can advantageously be used for security purposes.

At a general level, target tracking can provide for the detection of a target having breached (or on a course to breach) a pre-defined perimeter.

The present invention provides for particular advantages. For example, a vehicle approaching on a constant bearing may constitute a threat, but does not provide for angular resolution enhancement by conventional aperture synthesis since there is no azimuth evolution. However, as the vehicle approaches, the operation of the first-order filter may be extended; features in the phase history may include accelerations and decelerations.

Figure 12:
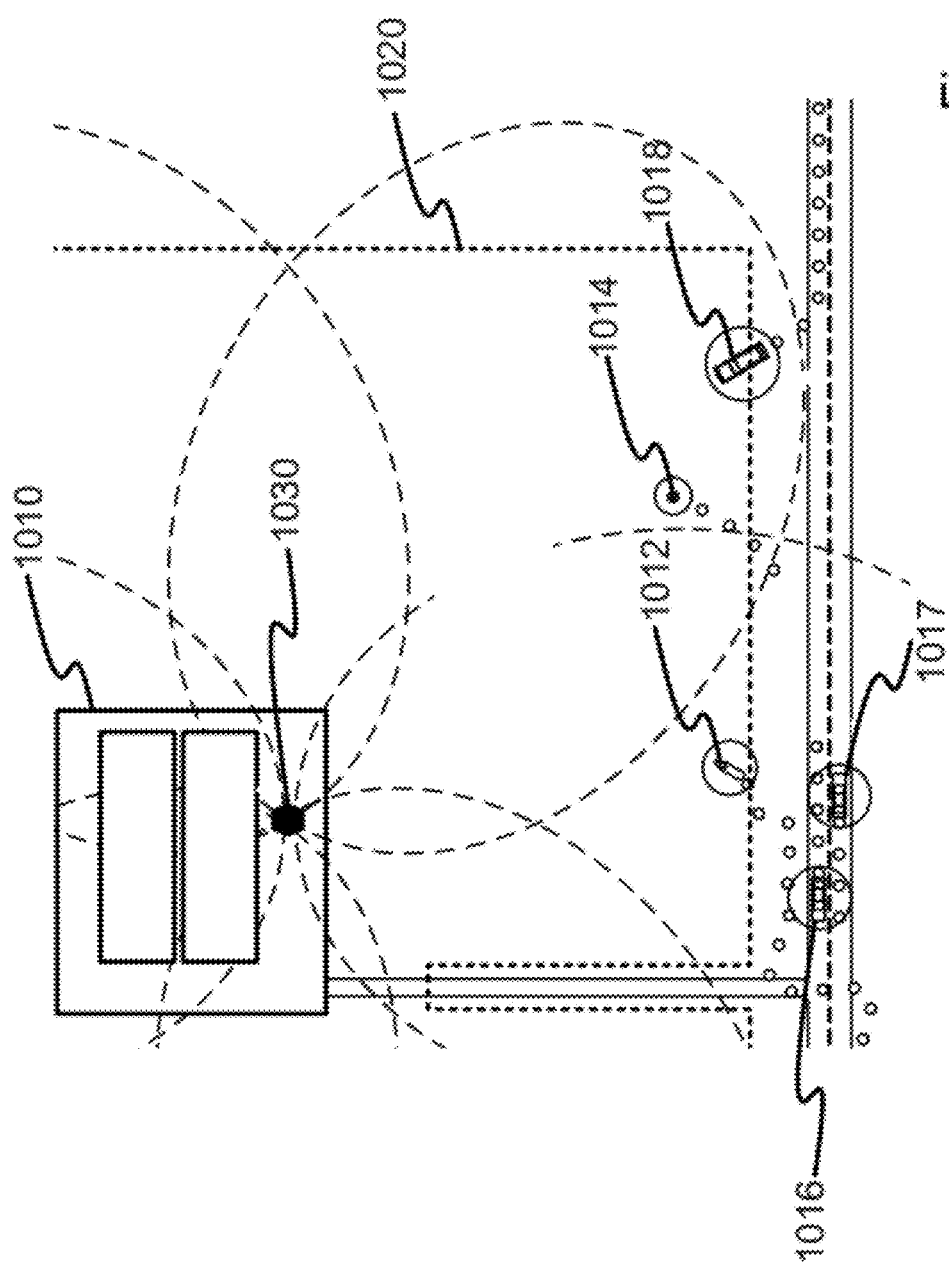
FIG. 12 is a representation of an embodiment of an active perimeter system incorporating the invention.

In one embodiment the system disclosed may comprise an 'active perimeter radar' as illustrated in FIG. 12. The active perimeter radar comprises a system 1000 for protecting a site 1010 from hostile vehicles or persons or the like. It will be appreciated that a similar system could also be used to protect against hostile vessels in a costal or river environment, for protecting large commercial ships and/or for other similar marine/terrestrial applications.

The system 1000 is configured to report the position, motion and characteristics of targets/objects in the neighborhood of a site 1010. The system is configured to classify targets into one of a plurality of classes, for example, an animal, a person, a small vehicle such as a car, a larger vehicle such as a truck, or the like, based on their speed, heading, size and any imaging information which can be obtained. For example, FIG. 12 shows targets which may be classified as follows:
   (1) Animal 1012
   (2) Pedestrian 1014
   (3) Vehicles 1016, 1017, 1018

The system 1000 is configured to assess targets, and to determine the threat they pose, based both on their classification and on their location relative to a defined site perimeter 1020.

Targets/objects may be classified according to whether they are within or without the perimeter 1020, i.e. the perimeter may be set to assist in exclusion (defining a protected area) or retention (defining say a prison area). Targets/objects in the vicinity of the perimeter 1020 may also be classified according to their speed, direction and/or target trajectory history.

In one embodiment, the active perimeter 1020 is initially set to extend to a predetermined extent. Alternatively, the extent of the perimeter 1020 may be limited by the location of objects. Where such objects comprise the perimeter 1020, the system 1000 classifies them as such according to the classification scheme described above and monitors them for changes.

It will be appreciated that multiple perimeters may be used simultaneously, with each perimeter defined independently and differently for different target classes (for example, the perimeter may be set larger for targets which are fast-moving to allow for their potentially faster approach to the site 1010 being protected), and may be defined and re-defined in response to changing operational conditions or requirements, for example, a changing threat level or the like. For example, FIG. 12 shows two vehicles 1016 and 1017 moving outside the perimeter 1020 along a road which may be assessed as 'behaving normally' thus posing no serious threat. A third vehicle 1018 is also shown turning across the perimeter 1020 and may be assessed as 'behaving suspiciously' thus representing a threat. Likewise, the perimeter 1020 for targets classed as "vehicles" 1016, 1018 may be larger than that for the class of "pedestrians" 1014 as the former may be considered more of a threat (and capable of reaching the site 1010 faster) than the latter. The extent of the perimeter 1020 may therefore be set to provide a predetermined or preferred 'early-warning time' which is identical irrespective of the speed of the threatening target.

In a further embodiment, an individual perimeter 1020 may be set with respect to a specific identified target. In a further variant, a series or cascade of perimeters of decreasing extent can be defined for said target, corresponding to a series of warning zones of increasing threat severity as the target approaches the site 1010.

A display unit (not shown) is provided to indicate current targets of interest and their classification, automatically highlighting and providing more information on those identified as representing the greatest threat.

The system includes a detector unit 1030 comprising a small, mast mounted sensor array arranged to provide 360° angular coverage to a required range. It will be appreciated that whilst 360° is shown and described any required angular coverage may be provided for. Furthermore, the system may be configured to provide coverage for any suitable range. Typically, for example, the range provided for is between 0.2 and 2 km.

The detector unit comprises a plurality of detector elements arranged to provide the required radial coverage. Each element of the detector unit 1030 preferably comprises an antenna array as described generally with reference to FIG. 3, having a plurality of receive antennas (for example three) for receiving reflected pulses and at least one omnidirectional transmit antenna for emitting pulses for reflection by the targets being tracked. Each detector element may be of any suitable size, for example, 100 mm by 150 mm.

It will be appreciated that the detector unit may comprise a single detector element where the angular coverage provided by the detector element is sufficient.

The detector unit 1030 comprises the pulse generation and detection circuitry and the digital signal processing capability required for analysing signals reflected from targets/objects of potential interest, and for tracking multiple moving targets.

It will be appreciated that additional detector units and/or sensor arrays may be provided in dependence on requirements. For example, several detector units may be required for a large site or for a location where buildings might obstruct the field of view of a system with a single detector unit and/or detector element. Where a plurality of detector units are used they may be networked together to provide the desired coverage.

It will be appreciated that the wideband nature of the system may allow for the generation of very short (1-2 ns typical) pulses which in turn allow for high precision range measurements (~30 cm typical) and the easy separation of targets/objects based on their distance from the sensor array.

Targets detected by the system are initially distinguished from one another by their distance from the associated detector unit sensor array, and the speed at which they are moving. Filtering is applied to remove reflections from unwanted background surfaces (clutter rejection). Differences in arrival times of a reflected signal at different receive antennas are then used to determine elevation and azimuth angles of the targets to allow full three dimensional tracking of multiple targets substantially simultaneously.

It will be appreciated that in one embodiment the system can restrict the number of trajectories requiring consideration by assuming that targets of interest are on the ground.

It will also be appreciated that the classification of targets/objects will assist in the allocation of resources—both in terms of personnel and in concentrating the processing power on those targets deemed to most likely to present a threat. This will be especially beneficial where there is a large number of moving targets which presents a heavy computational burden if all require tracking to the same degree.

An alarm is triggered in response to a perceived threat, which may result from a target/object breaching the perimeter 1020, approaching the perimeter 1020 or from a perceived intent to approach/breach the perimeter 1020. Alternatively, projections made from target trajectory histories may be used to trigger the alarm on unexpected deviations from expected or predicted behaviour within or outside the perimeter 1020. Alternatively, the same criteria may be used to trigger a fully-automated response system.

Typical performance of a tested version of the system 1000 will now be described by way of example only. Typically, the system provide: a range of up to ~30m; a positional accuracy of between ~0.1 and ~2m depending on operating environment and available bandwidth; a maximum target velocity of ~30 m/s; and a maximum number of simultaneously tracked targets of between 3 and 10 for each detector element.

The system may be provided with a low-powered transmitter for short range applications, for example up to ~30 m. A higher power transmitter may be provided for increased range up to about 200m, scaleable up to 2 km or greater.

The transmitted beam pattern of each detector unit may be adapted to provide optimised coverage in any particular application.

More powerful processing hardware may be used to allow a greater number of targets to be tracked at higher speeds.

Typically the operating frequency of the detector unit is 5.8 GHz. The unit's operating frequency may, however, be any suitable frequency, for example a military radar frequency or the like.

Multiple detector elements (receive units) may be combined to increase the number of receive antennas. The provision of more receive antennas permits more information to be obtained about an target beyond its elevation and azimuth angles, for example, to make estimations of size and shape possible. However, by analysing and compensating for the motion of an target, crude images of that target can (subject to operating environment) be formed by inverse synthetic aperture radar (ISAR), using only a limited number of receive antennas.

The system may also include at least one video camera with radar positioning information being used to determine which portions of the camera's image to extract for further analysis.

The combination of the above imaging techniques allows a central processing unit to automatically classify (for example as: pedestrian, wild animal, small car, armoured vehicle or truck) those targets of greatest interest (for example, those moving most rapidly towards the area being protected) and assess the threat they may pose. The threat assessment, together with any available image data, may then be presented to an operator of the system for further action.

In one embodiment, only the most relevant or threatening regions of space are imaged and processed.

The active perimeter radar described above has many other advantageous applications including, for example, the deployment of troops or the like in a more efficient manner, because the system allows a large perimeter to set up and well-guarded by only a limited number of people. The system also allows a more reliable and timely warning of approaching threats therby allowing more effective interception and fewer casualties.

The system is also particularly advantageous because it provides real-time 3D tracking of multiple targets, potentially over a 360-degree field of view (according to configuration), and classification of the threat these may pose regardless of many environmental conditions. For example, the sytem operates in all weathers including through dust and fog and is effective regardless of ambient lighting conditions, including at night.

Such a system is radically different to current ground surveillance radar.

Use in a Marine Environment

The general principle is to discriminate between fixed objects and moving vessels. Fixed objects, such as buoys, need not necessarily pose a threat, but nevertheless need to be avoided.

Typical radar systems used in the marine environment comprise a rotating antenna. This prevents the sampling of reflected Doppler data for a particular detected target and thus prevents radar imaging.

Furthermore, for a small marine craft, waves may introduce short-term perturbations while the aggregate motion may be steady. Similarly, vertical perturbations may give rise to phase oscillations between vertically-spaced elements. This can be problematic for conventional synthetic aperture methods, which require knowledge of the relative motions of the radar platform and the target.

By contrast, the method according to the present invention can be advantageously adapted for use in the marine environment, relying as it does on essentially an attempt to determine trajectory of target by a series of improving estimates.

First, conventional radar is used to detect and track targets. This tracking information can be used to narrow down range the of possible target trajectories. For example, the set of possible estimated trajectories can be reduced by assuming that detected objects are on the water surface. Several possible trajectories can be evaluated to determine which results in the best focus, with the resulting image being optionally used in a pattern-matching algorithm.

3D Radar and Vision

Figure 13:
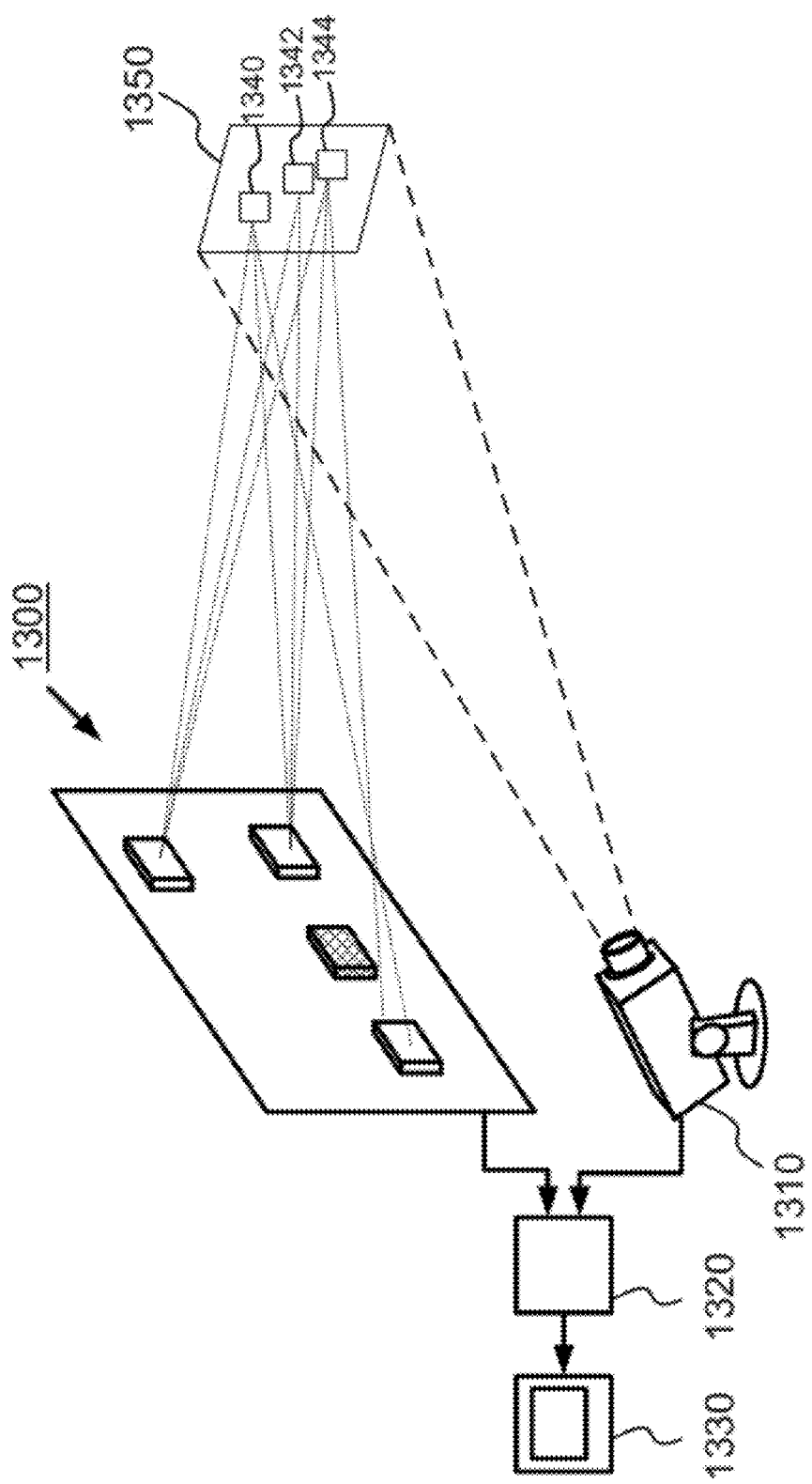
FIG. 13 is a representation of a 3D-radar linked to vision system.
Figure 14:
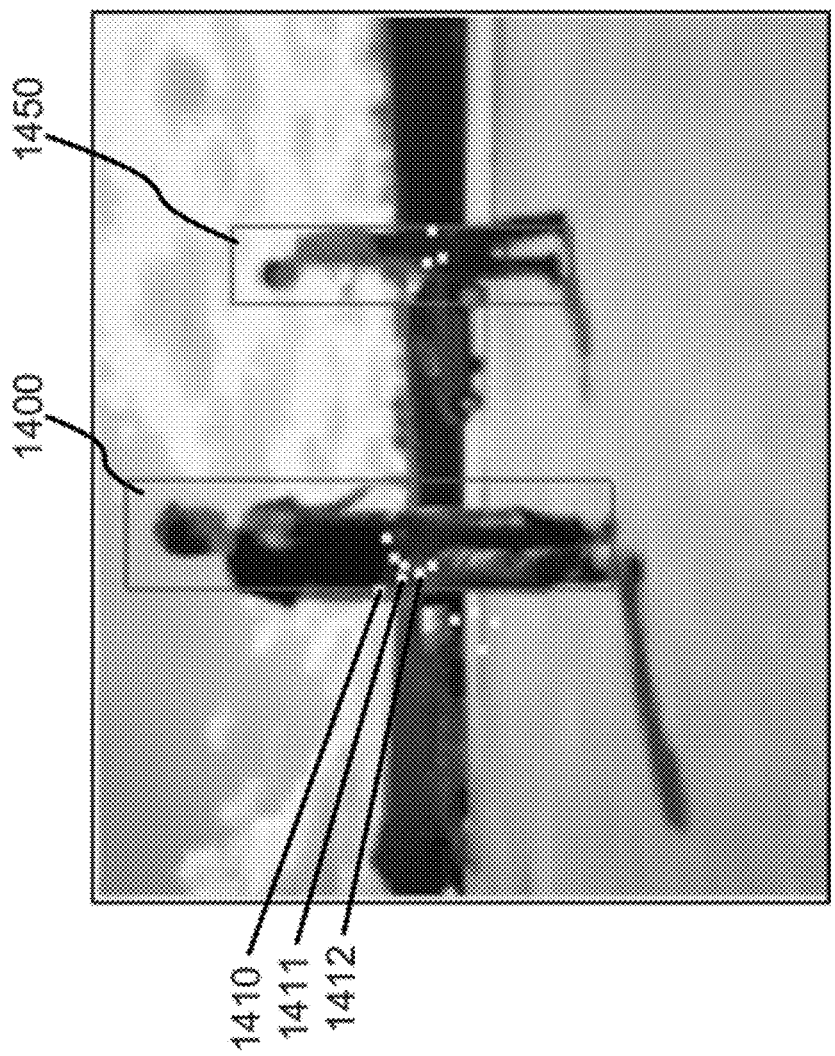
FIG. 14 illustrates an embodiment of a 3D-radar linked to vision system.

FIGS. 13 and 14 show further embodiments of the present invention, which provide for the combined use of the present invention with a video system. Such a system would find application in, for example, the automotive sector, where the driver would make use of enhanced display and the system would highlight items requiring the driver's attention and provide an alarm if required.

At a basic level, use of a combined radar and vision system allows use of a single camera with the radar providing range and/or velocity (range rate) information, rather than having to obtain the same information from a multiple camera system producing a stereo image, as commonly found in the prior art, which requires expensive and computationally intensive stereo image processing. The method presented here is both cheaper and more accurate.

In one embodiment, radar system 1300, comprising circuit elements as described previously in FIG. 4, is combined by means of interface and processing circuitry 1320 with a video system 1310. The output from the radar system 1300 is used by the interface and processing circuitry 1320 in combination with the video output from a video camera 1310 to provide augmented video display to the user via the display 1330.

For example, a short-range, wide field-of-view, radar system 1300 may comprise a 3D radar and is aimed in parallel with a wide-angle video sensor 1310. The radar 1300 is used to detect the position of targets 1340, 1342, 1344 in three dimensions; the direction and range of the "targets" are passed to a computer or interface and processing 1320 that generates the output image from the video sensor 1310, and superimposes icons on the image (displayed on a monitor 1330), in positions representing those of the targets.

The sizes of the icons are scaled to represent the distance to the targets—the further away they are, the smaller the icon. Other information, such as distance, can also be displayed alpha-numerically.

Range information provided by the radar 1300 allows the interface and processing circuitry 1320 to use a classification algorithm to take distance (range) into account and thereby determine the height of targets 1340, 1342, 1344.

In an automotive embodiment this would allow children to be distinguished from adults (and, bearing in mind the danger posed to them by traffic, appropriately highlighted in the augmented display 1330). Furthermore, distance information may also be used to optimise a flexible shape matching algorithm to allow for the identification of known shapes (e.g. the rear end of a car or truck, pedestrian crossings or traffic lights), as may be stored in a database. These may use edge and area-based metrics.

A more advanced embodiment makes use of the classification algorithms described above to superimpose classification data on the video output image displayed on monitor 1330. This allows for clear identification by the user of those targets which require attention, for example, a child suddenly appearing in the road ahead or a jaywalker.

FIG. 14 shows an augmented video output from such a combined 3D radar and vision system. Targets 1410, 1411, 1412 have been identified as a subject cluster and further classified as a pedestrian 1400. A further pedestrian 1450 has also been classified.

A further improvement is to use the 3D radar data to control the field-of-view of a video classification algorithm in azimuth, elevation and scale, to determine which of a number of classes of object is represented by the appropriate area of the image. For example, the detected target may be a person or a tree; the combined sensor may be able to position and classify it, for example, by searching for "head" features. The driver may then be advised either to stop and wait, in the case of a person, or to drive to avoid the obstacle, in the case of tree. Three-dimensional radar is particularly beneficial because the classifier may be directed in elevation as well as azimuth. For example, the process that discriminates a human head can be directed towards the highest point of a target cluster.

A yet further improvement is to make use of target track histories, as described in detail above. These will improve the quality of tracking by providing consistency across frames and allow for a degree of trajectory projection e.g. a pedestrian negotiating a crossing. Information regarding the projected or expected trajectory as determined from the target track history can also be used to cue the video system to anticipate the future position of the subject and to align and focus accordingly. This would allow for the image quality to be improved.

Referring again to FIG. 13, for any classification algorithm, the computational effort required of computer or signal processing circuitry 1320 is reduced by cueing the position and the scale of the object, based on the three-dimensional outputs of the radar 1300. Thus rather than process the entire image, the classification process is applied only to those areas 1350 of the image which are of immediate interest, and also a smaller number of image features and shape matchers are required. For a single object, this reduction may be by a factor of one hundred or more, thereby not only allowing for faster processing, but also reducing cost by allowing a relatively inexpensive image processing microprocessor (as part of computer or signal processing circuitry 1320) to achieve frame-rate (i.e. effectively real-time) performance comparable to that previously achievable only by a considerably more expensive, dedicated system.

It will be appreciated that when fusing the different sensors 1300, 1310 account needs to be taken of the false alarm distributions of each system. Preferably, the systems 1300, 1310 are matched in that the false alarm distributions are statistically independent, by for example relying on different physics, as in the combined 3D radar and vision system presented here, It will be further appreciated that the scenario in which the system is to be used will determine whether the priority is to mitigate false positive alarms or false negative alarms. For example, for a law enforcement scenario in which the option for forced entry into a premises is being considered, it is imperative to reduce the probability of false negatives i.e. erroneous declarations of the area under consideration being empty. By contrast, in an earthquake rescue scenario, where resources are scarce and time of the essence, it becomes more important to reduce the likelihood of false positives i.e. erroneous declarations of the presence of a survivor. Preferably, the system allows for either priority to be set.

In cases where the signal bandwidth is sufficiently narrow, an efficient filtering method such as a Fast Fourier Transform may be used in preference to the multi-branch time-domain filter.

In conclusion, embodiments of the present invention provide for a unique and flexible family of short range radar devices. The fundamental building block is a multi-channel sub-array with embedded signal generation, conversion and signal processing hardware. This can be used alone as a self-contained obstacle tracker in high volume applications, dominated by automotive driver aids, or adapted for more specialist fields such as through-wall surveillance or marine surveillance.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method of classifying items from reflected signals returned from said items, the method comprising: processing, said return signals to discriminate between a first set of signals indicative of items of interest and a further set of signals indicative of clutter; identifying items from said first set of signals and classifying them as a first class of item; processing said further set of signals to identify a second set of signals indicative of further items of interest; identifying items from said second set of signals and classifying them as a second class of item; and processing signals returned from a classified item over time and maintaining said classification, reclassifying said item, or declassifying said item in dependence on said processing.

2. A method according to claim 1 wherein the signals of said first set are indicative of items at least part of each of which is moving at least in part.

3. A method according to claim 2 wherein the signals of said second set are indicative of substantially stationary items.

4. A method according to claim 1 comprising determining at least one parameter comprising at least one of:
(a) at least one characteristic of a return signal from an identified item; and
(b) at least one attribute of an identified item; and classifying the item accordingly.

5. A method according to claim 4 comprising maintaining a history of the at least one determined parameter for an identified item and classifying the item in dependence on said history.

6. A method according to claim 5 wherein said determined parameter history is maintained for an item from when it is first detected.

7. A method according to claim 4 comprising determining a prediction of the at least one determined parameter and classifying said item in dependence on the conformity of a signal return from the item with said prediction.

8. A method according to claim 7 wherein said prediction is refined over time in dependence on historical data.

9. A method according to claim 4 comprising comparing said determined parameter or history thereof with a modelling function and classifying the item in dependence on said comparison.

10. A method according to claim 9 comprising iteratively comparing said determined parameter or history thereof with modelling functions of increasingly higher order and classifying the item in dependence on said comparison.

11. A method according to claim 9 wherein the or at least one modelling function is at least one of:
(a) mathematical function;
(b) an oscillatory function; and
(c) adaptive over time in dependence on historical parameter data.

12. A method according to claim 4 comprising comparing the at least one determined parameter or history thereof with a stored parameter or parameter history and classifying the item in dependence on said comparison.

13. A method according to claim 4 wherein the at least one determined parameter comprises a characteristic comprising at least one of phase, phase mismatch, and amplitude or signal strength/intensity.

14. A method according to claim 4 wherein the at least one determined parameter comprises an attribute comprising at least one of position, range, range rate, velocity, acceleration, track, and trajectory.

15. A method according to claim 1 comprising determining a velocity of at least part of each identified item from said return signals and classifying the item accordingly.

16. A method according to claim 15 wherein an item is classified as said first class of item if at least one of the following applies:
(a) said velocity is non-zero;
(b) said velocity is nonzero for a predetermined number or percentage of scans; and
(c) said velocity is non-zero when averaged over time.

17. A method according to claim 15 wherein an item is classified as said second class of item if at least one of the following applies:
(a) said velocity is zero;
(b) said velocity is zero for a predetermined number or percentage of scans; and
(c) said velocity is below a predetermined threshold when averaged over time.

18. A method according to claim 1 wherein an item classified as said first class of item remains so classified for at least a predetermined number of scans after reflected signals from said item are no longer received.

19. A method according to claim 1 wherein said classification is dependent on a confidence level that said item has been correctly classified as a first or second class of item.

20. A method according to claim 1 wherein when an item is classified said classification persists in dependence on a confidence level that said item has been correctly classified.

21. A method according to claim 1 wherein said classified item is initially classified as a second class of item and as a result of said processing over time said item is reclassified as a first class of item.

22. A method according to claim 1 comprising processing return signals from items classified as items of said first class or said second class and further classifying said items into different classes or sub-classes.

23. A method according to claim 1 wherein each classification is stored in a classification history for the item to which the classification relates.

24. A method according to claim 1 wherein said classification comprises deriving an indication of a material type for an item from the corresponding return signals and classifying the item accordingly.

25. A method according to claim 1 comprising classifying an item in dependence on its interaction with another item.

26. A method according to claim 25 wherein said interaction comprises one of the items moving behind the other.

27. A method according to claim 1 comprising identifying a cluster of responses from different parts of an item and classifying the item in dependence on the nature of said cluster.

28. A method according to claim 27 wherein said cluster comprises between three and fifteen responses.

29. A method according to claim 27 wherein said cluster comprises ten responses.

30. A method according to claim 1 comprising determining a threat level for an item and classifying said item into a class or sub-class accordingly.

31. A method according to claim 1 wherein each classification, reclassification, and/or declassification is stored in a classification history for the item to which it relates.

32. Apparatus for classifying items from reflected signals returned from said items, the apparatus comprising:
 a receiver for receiving said return signals; and
 a processor for processing said return signals, said processor being configured for:
  processing said return signals to discriminate between a first set of signals indicative of items of interest and a further set of signals indicative of clutter;
  identifying items from said first set of signals and classifying them as a first class of item;
  processing said further set of signals to identify a second set of signals indicative of further items of interest;
  identifying items from said second set of signals and classifying them as a second class of item; and
  processing signals returned from a classified item over time and maintaining said classification, reclassifying said item, or declassifying said item in dependence on said processing.

33. Apparatus according to claim 32 comprising means for outputting a representation of each classified item for display, and means for displaying said representation.

34. Apparatus according to claim 32 comprising means for outputting an alert signal if the classification of an item changes and means for issuing an associated alert.

35. Apparatus according to claim 32 wherein the processing means comprises means for extracting at least one parameter comprising at least one of: (a) a characteristic of a return signal from an identified hem; and (b) an attribute of an identified item; and for classifying the item accordingly.

36. Apparatus according to claim 32 wherein said classified item is initially classified as a second class of item and said processor is operable to, as a result of said processing over time, reclassify said item as a first class of item.

37. Apparatus according to claim 32 wherein the processor is operable to store each classification, reclassification, and/or declassification in a classification history for the item to which it relates.

38. Apparatus for classifying items from reflected signals returned from said items, the apparatus comprising:
 a receiver for receiving said return signals;
 a processor for processing said return signals said processor being configured for:
  processing said return signals to discriminate between a first set of signals indicative of items of interest and a further set of signals indicative of clutter;
  identifying items from said first set of signals and classifying them as a first class of item;
  processing said further set of signals to identify a second set of signals indicative of further items of interest; and
  identifying items from said second set of signals and classifying them as a second class of item;
 wherein an item classified as said first class of item remains so classified for at least a predetermined number of scans after reflected signals from said item are no longer received.

39. A method of classifying items from reflected signals returned from said items, the method comprising:
 processing said return signals to discriminate between a first set of signals indicative of items of interest and a further set of signals indicative of clutter;
 identifying items from said first set of signals and classifying them as a first class of item;
 processing said further set of signals to identify a second set of signals indicative of further items of interest;
 identifying items from said second set of signals and classifying them as a second class of item; and
 processing return signals from items classified as items of said first class or said second class and further classifying said items into different classes or sub-classes.

40. A method according to claim 39 wherein each classification, reclassification, and/or classification into a sub-class is stored in a classification history for the item to which it relates.

41. Apparatus for classifying items from reflected signals returned from said items, the apparatus comprising:
 a receiver for receiving said return signals;
 a processor for processing said return signals said processor being configured for:
  processing said return signals to discriminate between a first set of signals indicative of items of interest and a further set of signals indicative of clutter;
  identifying items from said first set of signals and classifying them as a first class of item;
  processing said further set of signals to identify a second set of signals indicative of further items of interest;
  identifying items from said second set of signals and classifying them as a second class of item; and
  processing return signals from items classified as items of said first class or said second class and further classifying said items into different classes or sub-classes.

42. A method according to claim 41 wherein said processor is operable to store each classification, reclassification, and/or classification into a sub-class in a classification history for the item to which it relates.

43. A method of classifying items from reflected signals returned from said items, the method comprising:
 processing said return signals to discriminate between a first set of signals indicative of items of interest and a further set of signals indicative of clutter;
 identifying items from said first set of signals and classifying them as a first class of item;

processing said further set of signals to identify a second set of signals indicative of further items of interest; and identifying items from said second set of signals and classifying them as a second class of item;

wherein each said classification is stored in a classification history for the item to which the classification relates.

44. Apparatus for classifying items from reflected signals returned from said items, the apparatus comprising:

a receiver for receiving said return signals;

a processor for processing said return signals said processor being configured for:

processing said return signals to discriminate between a first set of signals indicative of items of interest and a further set of signals indicative of clutter;

identifying items from said first set of signals and classifying them as a first class of item;

processing said further set of signals to identify a second set of signals indicative of further items of interest; and identifying items from said second set of signals and classifying them as a second class of item;

wherein each said classification is stored in a classification history for the item to which the classification relates.

45. A method of classifying items from reflected signals returned from said items, the method comprising:

processing said return signals to discriminate between a first set of signals indicative of items of interest and a further set of signals indicative of clutter;

identifying items from said first set of signals and classifying them as a first class of item;

processing said further set of signals to identify a second set of signals indicative of further items of interest; and identifying items from said second set of signals and classifying them as a second class of item;

wherein said identifying items from said first set of signals and classifying them as a first class of item and/or said identifying items from said second set of signals and classifying them as a second class of item comprises identifying a cluster of responses from different parts of an item and classifying the item in dependence on the nature of said cluster.

46. A method according to claim 45 wherein said cluster comprises between three and fifteen responses.

47. A method according to claim 46 wherein said cluster comprises ten responses.

48. Apparatus for classifying items from reflected signals returned from said items, the apparatus comprising:

a receiver for receiving said return signals;

a processor for processing said return signals said processor being configured for:

processing said return signals to discriminate between a first set of signals indicative of items of interest and a further set of signals indicative of clutter;

identifying items from said first set of signals and classifying them as a first class of item;

processing said further set of signals to identify a second set of signals indicative of further items of interest; and identifying items from said second set of signals and classifying them as a second class of item;

wherein said identifying items from said first set of signals and classifying them as a first class of item and/or said identifying items from said second set of signals and classifying them as a second class of item comprises identifying a cluster of responses from different parts of an item and classifying the item in dependence on the nature of said cluster.

49. A method according to claim 48 wherein said cluster comprises between three and fifteen responses.

50. A method according to claim 49 wherein said cluster comprises ten responses.

51. A method of classifying items from reflected signals returned from said items, the method comprising:

processing said return signals to discriminate between a first set of signals indicative of items of interest and a further set of signals indicative of clutter;

identifying items from said first set of signals and classifying them as a first class of item;

processing said further set of signals to identify a second set of signals indicative of further items of interest; and identifying items from said second set of signals and classifying them as a second class of item;

wherein an item classified as said first class of item remains so classified for at least a predetermined number of scans after reflected signals from said item are no longer received.

* * * * *

UNITED STATES PATENT AND TRADEMARK OFFICE
CERTIFICATE OF CORRECTION

PATENT NO. : 8,314,732 B2  
APPLICATION NO. : 12/525061  
DATED : November 20, 2012  
INVENTOR(S) : Oswald et al.

Page 1 of 1

It is certified that error appears in the above-identified patent and that said Letters Patent is hereby corrected as shown below:

In The Claims

In column 55, line 40, in Claim 1, delete "processing," and insert --processing--, therefor In column 56, line 43, in Claim 16, delete "nonzero" and insert --non-zero--, therefor In column 57, line 58, in Claim 35, delete "hem" and insert --item--, therefor Signed and Sealed this
Twenty-seventh Day of October, 2015

Michelle K. Lee
*Director of the United States Patent and Trademark Office*